US011223826B2

(12) United States Patent
Nishiyama et al.

(10) Patent No.: US 11,223,826 B2

(45) Date of Patent: Jan. 11, 2022

(54) IMAGE PROCESSING DEVICE, IMAGING DEVICE, IMAGE PROCESSING METHOD, AND IMAGE PROCESSING PROGRAM

(71) Applicant: FUJIFILM Corporation, Tokyo (JP)

(72) Inventors: Yukinori Nishiyama, Saitama (JP); Tetsu Wada, Saitama (JP); Koichi Tanaka, Saitama (JP); Tetsuya Fujikawa, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/183,051

(22) Filed: Feb. 23, 2021

(65) Prior Publication Data

US 2021/0176470 A1 Jun. 10, 2021

Related U.S. Application Data

(63) Continuation of application No. PCT/JP2019/031266, filed on Aug. 7, 2019.

(30) Foreign Application Priority Data

Sep. 26, 2018 (JP) ............................ JP2018-179972

(51) Int. Cl.
*H04N 19/124* (2014.01)
*H04N 19/172* (2014.01)
(Continued)

(52) U.S. Cl.
CPC ......... *H04N 19/124* (2014.11); *H04N 5/2353* (2013.01); *H04N 5/772* (2013.01); *H04N 5/783* (2013.01); *H04N 19/172* (2014.11)

(58) Field of Classification Search
CPC ..... H04N 19/124; H04N 19/172; H04N 5/783
See application file for complete search history.

(56) References Cited

U.S. PATENT DOCUMENTS

2012/0194643 A1 8/2012 Maruyama
2018/0084284 A1* 3/2018 Rosewarne ............ H04N 19/91

FOREIGN PATENT DOCUMENTS

JP 2006-295852 A 10/2008
JP 2012-178818 A 9/2012
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2019/031266, dated Apr. 8, 2021, with an English translation.

(Continued)

*Primary Examiner* — Kyle M Lotfi

(74) *Attorney, Agent, or Firm* — Birch, Stewart, Kolasch & Birch, LLP

(57) ABSTRACT

Provided are an image processing device capable of performing compression processing on a video captured in each video capturing mode according to a first video capturing mode and a second video capturing mode with different capturing conditions. A possible range of a quantization parameter applied in a case where the video is compressed is made different in the first video capturing mode and the second video capturing mode with different capturing conditions. The quantization parameter is determined within a first range in a case of the first video capturing mode, and the quantization parameter is determined within a second range narrower than the first range in a case of the second video capturing mode. In particular, a second upper limit value of the second range is smaller than a first upper limit value of the first range, and a second lower limit value of the second range is larger than a first lower limit value of the first range.

16 Claims, 10 Drawing Sheets

[VIDEO FOR STATIC IMAGE EXTRACTION]

(51) Int. Cl.
*H04N 5/783* (2006.01)
*H04N 5/235* (2006.01)
*H04N 5/77* (2006.01)

(56) References Cited

FOREIGN PATENT DOCUMENTS

| | | | |
|---|---|---|---|
| JP | 2013-187834 | A | 9/2013 |
| JP | 2016-32303 | A | 3/2016 |
| WO | WO-2011/021345 | A1 | 2/2011 |

OTHER PUBLICATIONS

International Search Report (Form PCT/ISA/210) for International Application No. PCT/JP2019/031266, dated Oct. 29, 2019, with an English translation.

* cited by examiner

[VIDEO FOR STATIC IMAGE EXTRACTION]

IMAGE PROCESSING DEVICE, IMAGING DEVICE, IMAGE PROCESSING METHOD, AND IMAGE PROCESSING PROGRAM

CROSS-REFERENCE TO RELATED APPLICATIONS

This application is a Continuation of PCT International Application No. PCT/JP2019/031266 filed on Aug. 7, 2019, which claims priority under 35 U.S.C. § 119(a) to Japanese Patent Application No. 2018-179972 filed on Sep. 26, 2018. Each of the above application(s) is hereby expressly incorporated by reference, in its entirety, into the present application.

BACKGROUND OF THE INVENTION

1. Field of the Invention

The present invention relates to an image processing device, an imaging device, an image processing method, and a non-transitory computer readable medium for storing an image processing program, and more particularly to a video compression technique.

2. Description of the Related Art

In recent years, an imaging device having a video capturing mode for capturing a video for static image extraction is proposed in order to image a momentary scene of a subject (JP2016-032303A).

In the video for static image extraction described in JP2016-032303A, an exposure time of one frame is set shorter than that of a normal video, for example.

By the way, in a case where the video is recorded, the video is compressed by, for example, a moving picture experts group (MPEG) encoding method for the recording since an amount of data of the video is enormous.

In a case where the video is compressed, there is a problem that image quality deteriorates as a compression ratio of the video is high while a bit rate (the number of bits transferred or processed per unit time) increases and exceeds processing capacity of the device as the compression ratio thereof is low.

Therefore, a quantization parameter (QP) value is controlled according to an amount of generated code after quantization of image data of a past frame of the video. In a case where the amount of generated code increases, the QP value is increased (compression ratio is increased) to restrict the bit rate not to exceed the processing capacity. In a case where the amount of generated code decreases, the QP value is decreased (compression ratio is decreased) to improve the image quality.

JP2013-187634A proposes an image processing device capable of avoiding deterioration of image quality immediately after an image to be processed is switched from a static image to a video. This image processing device limits an amount of generated code to a lower limit value in a case where the amount of generated code is equal to or lower than the lower limit value set in advance, which may occur immediately after the image to be processed is switched from the static image to the video.

That is, even in a case where an actual amount of generated code is zero or close to zero since an image to be compressed is the static image, it is regarded that a certain amount of code (lower limit value) is generated. Accordingly, the QP value is not set excessively small at a time point in which the image to be compressed is switched from the static image to the video. As a result, the deterioration of the image quality of the video at the time point in which the image to be compressed is switched from the static image to the video is avoided with no occurrence of a situation where a region where the QP value is set excessively small and a region where the QP value is set excessively large are repeated immediately after the image to be compressed is switched from the static image to the video.

SUMMARY OF THE INVENTION

The image processing device described in JP2013-187634A performs compression processing on an input image in which a frame of the static image and a frame of the video are mixed and does not perform the compression processing on the video for static image extraction.

In a case where the video for static image extraction is a target of the compression processing, it is necessary to maintain constant image quality (image quality required as the static image) for all frames of the video since a random frame of the video may be extracted as the static image. However, in JP2013-187634A, there is no description of performing the compression processing on the video for static image extraction, and the compression processing for maintaining the constant image quality for all the frames of the video is not performed.

In a case of a normal video that is viewed as a video, the compression processing is optimized in consideration of the image quality of the entire video. Therefore, the QP value may be adjusted to be too large for the purpose of extracting one frame of the video as the static image, and there is a problem that the image quality as the static image cannot be obtained.

The present invention has been made in view of the above circumstances, and an object thereof is to provide an image processing device, an imaging device, an image processing method, and a non-transitory computer readable medium for storing an image processing program capable of performing compression processing suitable for a video captured in each video capturing mode according to a first video capturing mode and a second video capturing mode with different capturing conditions.

In order to achieve the above object, the invention according to one aspect comprises an image processing device including a video acquisition section that acquires a video captured based on a first video capturing mode or a second video capturing mode with an imaging condition that is different from an imaging condition of the first video capturing mode, and a compression processing section that determines a quantization parameter of image data of a frame constituting the video acquired by the video acquisition section and compresses the image data. The compression processing section determines the quantization parameter within a first range in a case of the first video capturing mode and determines the quantization parameter within a second range in a case of the second video capturing mode, and a second upper limit value of the second range is smaller than a first upper limit value of the first range and a second lower limit value of the second range is larger than a first lower limit value of the first range.

According to one aspect of the present invention, a possible range of the quantization parameter applied in a case where the video is compressed is made different in the first video capturing mode and the second video capturing mode. The quantization parameter is determined within the first range in the case of the first video capturing mode and the quantization parameter is determined within the second range in the case of the second video capturing mode. In particular, the second upper limit value of the second range is smaller than the first upper limit value of the first range, and the second lower limit value of the second range is larger than the first lower limit value of the first range. Therefore, the compression processing can be performed such that constant image quality is maintained for all frames of the video and the bit rate is not too large by the compression processing on the video captured in the second video capturing mode as compared with the compression processing on the video captured in the first video capturing mode.

In the image processing device according to another aspect of the present invention, it is preferable that the second range is set according to a setting value of a frame rate.

In the image processing device according to still another aspect of the present invention, it is preferable that the second range is set according to an input from an instruction input section that receives an instruction from an outside.

In the image processing device according to still another aspect of the present invention, it is preferable that a scene discrimination section that discriminates a scene of the video acquired by the video acquisition section is further provided and the second range is set according to the scene discriminated by the scene discrimination section. In a scene such as a sports scene in which there is a lot of movement of the subject, it is considered that the second lower limit value is set larger than other modes in which the movement is small such that the bit rate is not too large can be considered.

In the image processing device according to still another aspect of the present invention, it is preferable that the compression processing section compresses the video by an MPEG encoding method. The MPEG encoding method is a typical encoding method for compressing the video and includes MPEG-2, MPEG-4, H.264/AVC, and the like.

In the image processing device according to still another aspect of the present invention, it is preferable that the compression processing section determines the quantization parameter according to an amount of generated code after quantization of image data of a past frame of the video.

In the image processing device according to still another aspect of the present invention, it is preferable that, in the second video capturing mode, at least one of a shutter speed, a speed of autofocus, a tracking speed of automatic exposure, a tracking speed of white balance, or a frame rate is set faster than that of the first video capturing mode.

An imaging device according to still another aspect of the present invention comprises an imaging device including the image processing device and a video capturing section that captures a video based on the first video capturing mode or the second video capturing mode. The video acquisition section acquires the video captured by the video capturing section.

The invention according to still another aspect comprises an image processing method including a video acquisition step of acquiring a video captured based on a first video capturing mode or a second video capturing mode with an imaging condition that is different from an imaging condition of the first video capturing mode, and a compression processing step of determining a quantization parameter of image data of a frame constituting the video acquired in the video acquisition step and compressing the image data. In the compression processing step, the quantization parameter is determined within a first range in a case of the first video capturing mode and the quantization parameter is determined within a second range in a case of the second video capturing mode, and a second upper limit value of the second range is smaller than a first upper limit value of the first range and a second lower limit value of the second range is larger than a first lower limit value of the first range.

In the image processing method according to still another aspect of the present invention, it is preferable that the second range is set according to a setting value of a frame rate.

In the image processing method according to still another aspect of the present invention, it is preferable that the second range is set according to an input from an instruction input section that receives an instruction from an outside.

In the image processing method according to still another aspect of the present invention, it is preferable that a step of discriminating a scene of the video acquired in the video acquisition step is further provided and the second range is set according to the discriminated scene.

In the image processing method according to still another aspect of the present invention, it is preferable that, in the compression processing step, the video is compressed by an MPEG encoding method.

In the image processing method according to still another aspect of the present invention, it is preferable that, in the compression processing step, the quantization parameter is determined according to an amount of generated code after quantization of image data of a past frame of the video.

In the image processing method according to still another aspect of the present invention, it is preferable that, in the second video capturing mode, at least one of a shutter speed, a speed of autofocus, a tracking speed of automatic exposure, a tracking speed of white balance, or a frame rate is set faster than that of the first video capturing mode.

The invention according to still another aspect comprises a non-transitory computer readable medium for storing an image processing program causing a computer to realize the following functions of a video acquisition function of acquiring a video captured based on a first video capturing mode or a second video capturing mode with an imaging condition that is different from an imaging condition of the first video capturing mode, and a compression processing function of determining a quantization parameter of image data of a frame constituting the video acquired by the video acquisition function and compressing the image data. In the compression processing function, the quantization parameter is determined within a first range in a case of the first video capturing mode and the quantization parameter is determined within a second range in a case of the second video capturing mode, and a second upper limit value of the second range is smaller than a first upper limit value of the first range and a second lower limit value of the second range is larger than a first lower limit value of the first range.

According to the present invention, it is possible to perform suitable compression processing on the video captured in each video capturing mode according to the first video capturing mode and the second video capturing mode with different capturing conditions. In particular, the compression processing can be performed such that the constant image quality is maintained for all the frames of the video and the bit rate is not too large by the compression processing on the video captured in the second video capturing mode as compared with the compression processing on the video captured in the first video capturing mode.

DESCRIPTION OF THE PREFERRED EMBODIMENTS

Hereinafter, preferred embodiments of an image processing device, an imaging device, an image processing method, and an image processing program according to the present invention will be described with reference to accompanying drawings.

<Appearance of Imaging Device>

Figure 1:
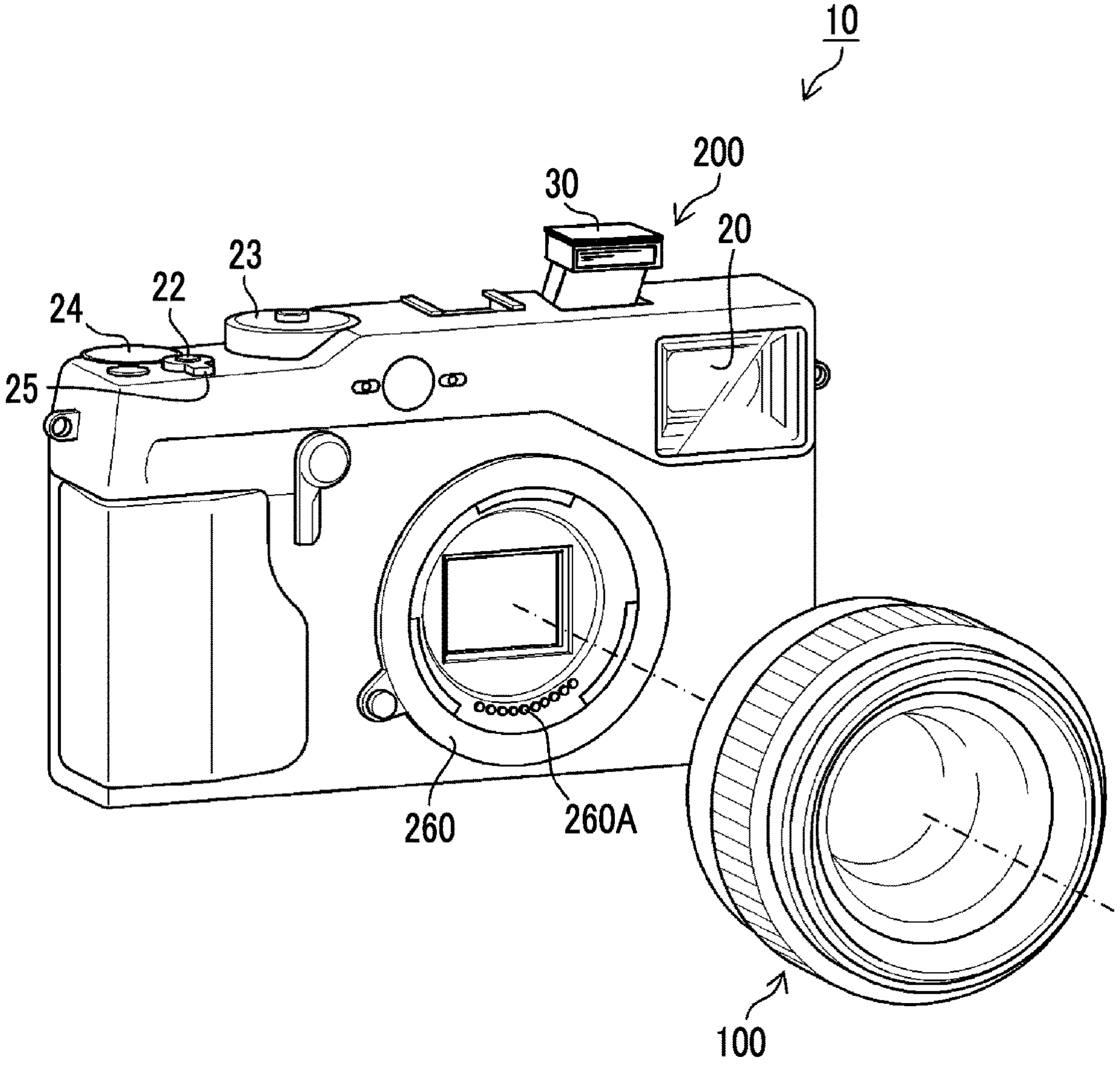
FIG. 1 is a perspective view of an imaging device according to the present invention as viewed obliquely from the front.
Figure 2:
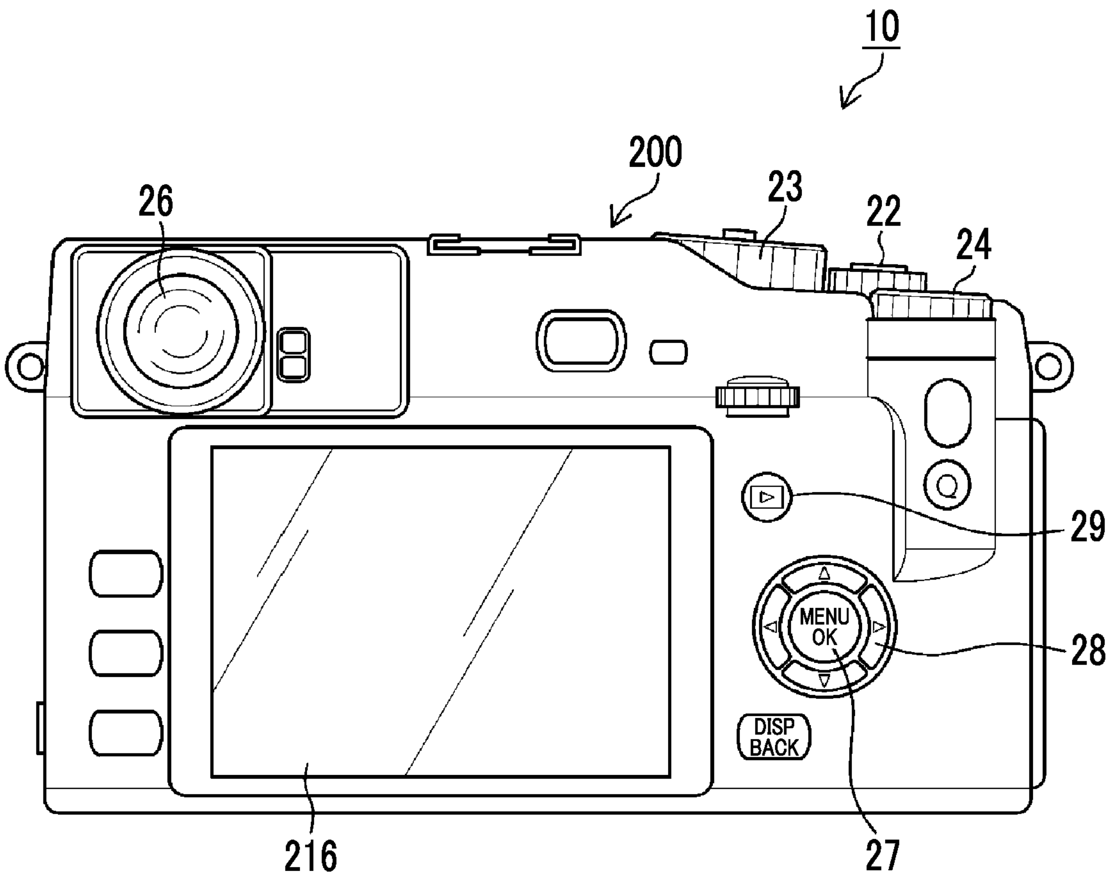
FIG. 2 is a rear view of the imaging device.

FIG. 1 is a perspective view of an imaging device according to the present invention as viewed obliquely from the front, and FIG. 2 is a rear view of the imaging device.

As shown in FIG. 1, an imaging device 10 is a mirrorless digital single-lens camera constituted of an interchangeable lens 100 and a camera body 200 to and from which the interchangeable lens 100 is attached and detached.

In FIG. 1, a body mount 260 to which the interchangeable lens 100 is attached, a viewfinder window 20 of an optical viewfinder, and the like are provided on a front surface of the camera body 200. A shutter release switch 22, a shutter speed dial 23, an exposure correction dial 24, a power lever 25, and a built-in flash 30 are mainly provided on an upper surface of the camera body 200.

As shown in FIG. 2, a liquid crystal monitor 216, an eyepiece section 26 of the optical viewfinder, a MENU/OK key 27, a cross key 28, a playback button 29, and the like are mainly provided on a back surface of the camera body 200.

The liquid crystal monitor 216 displays a live view image in an imaging mode or performs a playback display of a captured image in a playback mode, and functions as a display section that displays various menu screens and as a notification section that notifies a user of various pieces of information. The MENU/OK key 27 is an operation key having both a function as a menu button for performing a command to display a menu on the screen of the liquid crystal monitor 216 and a function as an OK button for performing a command to confirm, execute, and the like of a selected content. The cross key 28 is an operation section that receives instructions in four directions of up, down, left, and right, and functions as a multi-function key for selecting an item from the menu screen or for performing an instruction to select various setting items from each menu. Up and down keys of the cross key 28 function as zoom switches during the imaging or playback zoom switches during the playback mode. Left and right keys thereof function as frame feed (forward and reverse directions) buttons during the playback mode. The cross key 28 also functions as an operation section that designates a random subject whose focus is adjusted from among a plurality of subjects displayed on the liquid crystal monitor 216.

The MENU/OK key 27, the cross key 28, and the liquid crystal monitor 216 function as an imaging mode selection section that selects various imaging modes and function as a scene selection section (scene discrimination section).

That is, it is possible to set a static image imaging mode for imaging a static image and a video capturing mode for capturing a video by operating the MENU/OK key 27, displaying the menu screen on the liquid crystal monitor 216, and using the menu screen. The video capturing mode includes a first video capturing mode and a second video capturing mode in which an imaging condition is different from that of the first video capturing mode.

In the second video capturing mode, a video whose imaging condition is different from that of the first video capturing mode (a video whose imaging condition is more focused on extraction of the static image than viewing of the video itself) is imaged. Specifically, in the second video capturing mode, at least one of a shutter speed, a speed of autofocus, a tracking speed of automatic exposure, or a tracking speed of white balance is set faster than that of the first video capturing mode and/or a frame rate is set higher than that of the first video capturing mode. Resolution and the frame rate are set to the highest values (for example, 4,000×2,000 pixels, 30 fps (frames/second)) that can be set by the imaging device 10, and a tone is also set on an assumption of the static image extraction. An upper limit of ISO sensitivity is also higher than that in the first video capturing mode.

For example, the shutter speed is set to a value corresponding to a frame rate of a video to be recorded in the first video capturing mode (1/30 seconds in a case where the frame rate is 30 fps), but is set faster (for example, less than 1/30 seconds) than a frame interval in the second video mode. In the first video capturing mode, the shutter speed is set to the value corresponding to the frame rate of the video such that a smooth video is played back. However, a moving subject may be blurred in this case. Therefore, the shutter speed is set higher than that of the first video capturing mode (higher than the frame interval) in the second video capturing mode, and thus it is possible to extract a high-quality static image with less blurring of the subject. Similarly, it is possible to increase the shutter speed by increasing the upper limit of ISO sensitivity, and thus it is possible to extract a static image with less blurring. It is possible to acquire many frames focused on the subject, many frames with appropriate exposure, and the like by setting the speed of autofocus, the tracking speed of automatic exposure, the tracking speed of auto white balance, or the like faster than that of the first video capturing mode. The frame interval of the video is shorter by setting the frame rate to the high rate, and thus the number of frames that can be extracted as the static image increases. The setting value of the frame rate (30 fps, 60 fps, or the like) can be set using the MENU/OK key 27, the cross key 28, or the like.

With the second video capturing mode described above, it is possible to store the video and extract the frame constituting the video as the static image. Therefore, the user can easily image a photograph of an event (natural phenomenon, accident, happening, or the like) that does not know when it occurs, a photograph of a momentary state of a subject whose state changes with the passage of time or a moving subject, and the like. At this time, it is possible to extract the static image not only at the timing at which the recording of the static image is instructed but also at another timing. Therefore, the user can acquire the static image at a desired timing. With the setting of the imaging conditions (shutter speed, resolution, frame rate, and the like) suitable for the static image extraction, it is possible to extract a high-quality static image.

It is possible to select an imaging scene by operating the MENU/OK key 27, displaying the menu screen on the liquid crystal monitor 216, and using the menu screen. There are imaging scenes such as scenery, night view, sunset, macro, person, moving body, sports, and the like. It is possible to manually or automatically select or determine one of the imaging scenes and set the scene in the camera. An optimum imaging condition is set for the imaging scene according to the imaging scene set in the camera.

The playback button 29 is a button for switching to the playback mode in which the recorded static image or video is displayed on the liquid crystal monitor 216.

<Internal Configuration of Imaging Device>

[Interchangeable Lens]

Figure 3:
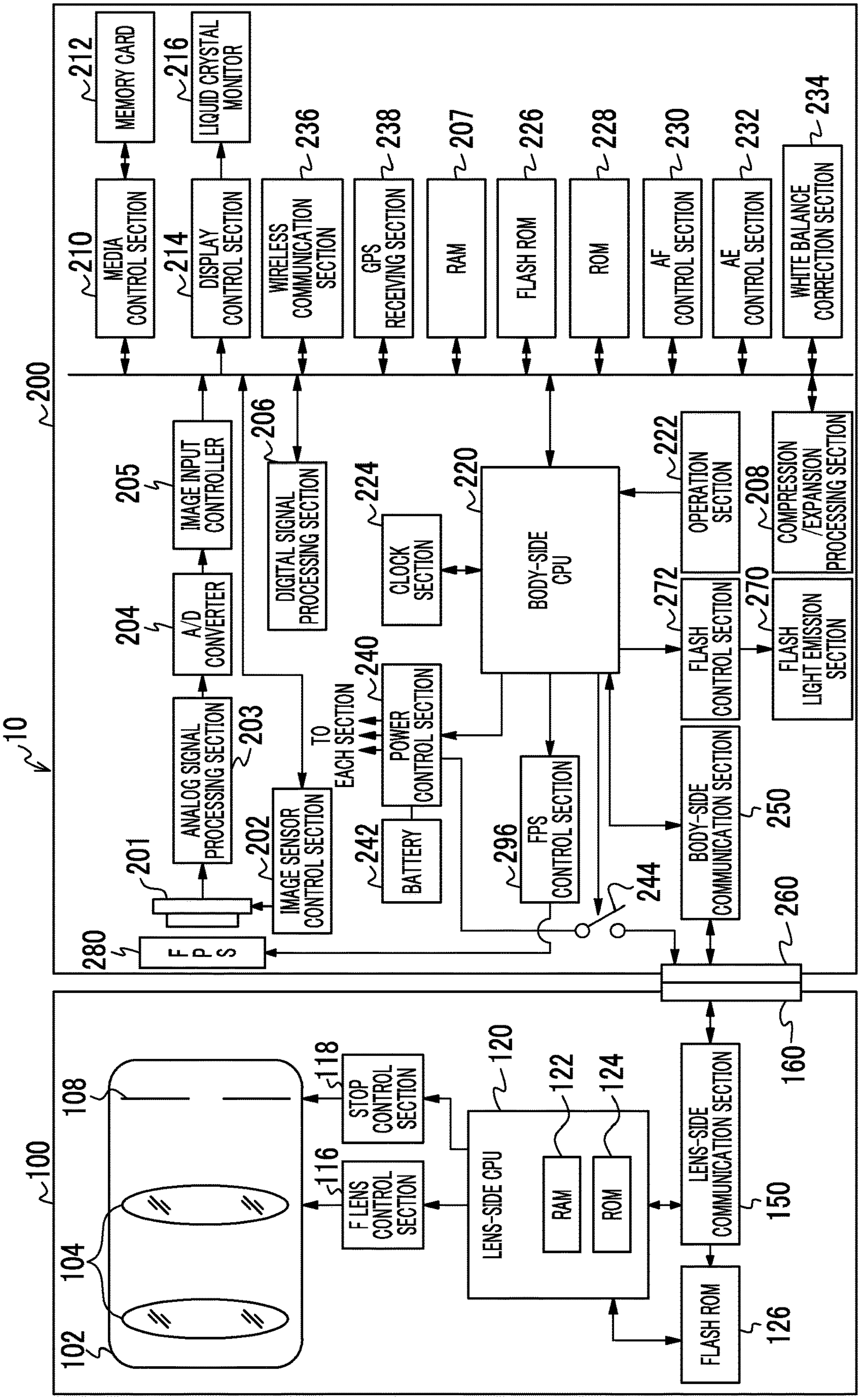
FIG. 3 is a block diagram showing an embodiment of an internal configuration of the imaging device.

FIG. 3 is a block diagram showing an embodiment of an internal configuration of the imaging device 10.

The interchangeable lens 100 that functions as an imaging optical system constituting the imaging device 10 is manufactured according to a communication standard of the camera body 200 and is an interchangeable lens capable of communicating with the camera body 200 as described below. The interchangeable lens 100 comprises an imaging optical system 102, a focus lens control section 116, a stop control section 118, a lens-side central processing unit (CPU) 120, a flash read only memory (ROM) 126, a lens-side communication section 150, and a lens mount 160.

The imaging optical system 102 of the interchangeable lens 100 includes a lens group 104 including a focus lens and a stop 108.

The focus lens control section 116 moves the focus lens according to a command from the lens-side CPU 120 to control a position of the focus lens (focus position). The stop control section 118 controls the stop 108 according to the command from the lens-side CPU 120.

The lens-side CPU 120 integrally controls the interchangeable lens 100 and has a ROM 124 and a random access memory (RAM) 122 built therein.

The flash ROM 126 is a non-volatile memory that stores a program or the like downloaded from the camera body 200.

The lens-side CPU 120 integrally controls each section of the interchangeable lens 100 according to a control program stored in the ROM 124 or the flash ROM 126, using the RAM 122 as a work region.

The lens-side communication section 150 communicates with the camera body 200 through a plurality of signal terminals (lens-side signal terminals) provided on the lens mount 160 in a state where the lens mount 160 is attached to the body mount 260 of the camera body 200. That is, the lens-side communication section 150 transmits and receives (bidirectional communication) a request signal and a reply signal to and from a body-side communication section 250 of the camera body 200 connected through the lens mount 160 and the body mount 260 according to the command from the lens-side CPU 120 to notify the camera body 200 of lens information (position information of the focus lens, focal length information, stop information, and the like) of each optical member of the imaging optical system 102.

The interchangeable lens 100 also comprises a detection section (not shown) that detects the position information of the focus lens and the stop information. The stop information is information indicating an F number of the stop 108, an opening diameter of the stop 108, and the like.

The lens-side CPU 120 preferably holds various pieces of lens information including the detected focus lens position information and stop information in the RAM 122 in order to respond to a request for lens information from the camera body 200. The lens information is detected in a case where there is the request for lens information from the camera body 200, in a case where the optical member is driven, or at a constant cycle (a cycle sufficiently shorter than a frame cycle of the video). The lens information can hold the detection result.

[Camera Body]

The camera body 200 constituting the imaging device 10 shown in FIG. 3 comprises an image sensor 201, an image sensor control section 202, an analog signal processing section 203, an analog/digital (A/D) converter 204, an image input controller 205, a digital signal processing section 206, a RAM 207, a compression/expansion processing section 208, a media control section 210, a memory card 212, a display control section 214, a liquid crystal monitor 216, a body-side CPU 220, an operation section 222, a clock section 224, a flash ROM 226, a ROM 228, an autofocus (AF) control section 230, an auto exposure (AE) control section 232, a white balance correction section 234, a wireless communication section 236, a global positioning system (GPS) receiving section 238, a power control section 240, a battery 242, a body-side communication section 250, a body mount 260, a flash light emission section 270 constituting the built-in flash 30 (FIG. 1), a flash control section 272, a focal-plane shutter (FPS) 280, and an FPS control section 296.

The image sensor 201 is constituted of a complementary metal-oxide semiconductor (CMOS) type color image sensor. The image sensor 201 is not limited to the CMOS type, but may be an XY address type or a charge-coupled device (CCD) type image sensor.

In each pixel of the image sensor 201, any one color filter of color filters (R filter, G filter, B filter) of three primary colors of red (R), green (G), and blue (B) is disposed according to a predetermined color filter array. The color filter array may be a general Bayer array, but is not limited thereto and may be another color filter array such as a Trans (registered trademark) array.

An optical image of the subject formed on a light receiving surface of the image sensor 201 by the imaging optical system 102 of the interchangeable lens 100 is converted into an electric signal by the image sensor 201. An electric charge corresponding to an amount of incident light is accumulated in each pixel of the image sensor 201, and an electric signal corresponding to an amount of electric charge (signal charge) accumulated in each pixel is read out as an image signal from the image sensor 201.

The image sensor control section 202 controls the reading of the image signal from the image sensor 201 according to a command from the body-side CPU 220. In a case where the static image is imaged, an exposure time is controlled by opening/closing of the FPS 280 and then the image sensor control section 202 reads all lines of the image sensor 201 in a state where the FPS 280 is closed. The image sensor 201 and the image sensor control section 202 of the present example can be driven by a so-called rolling shutter method in which an exposure operation is sequentially performed for at least one or more lines or pixels (that is, a method of sequentially resetting each line or pixel, starting electric charge accumulation, and reading the accumulated electric charge), and in particular, have a function of capturing the video or the live view image by the rolling shutter method in a state where the FPS 280 is opened.

The analog signal processing section 203 performs various kinds of analog signal processing on an analog image signal obtained by imaging the subject with the image sensor 201. The analog signal processing section 203 is constituted of including a sampling hold circuit, a color separation circuit, an automatic gain control (AGC) circuit, and the like. The AGC circuit functions as a sensitivity adjustment section that adjusts the sensitivity (ISO sensitivity (ISO: international organization for standardization)) at the time of imaging and adjusts a gain of an amplifier that amplifies an input image signal such that a signal level of the image signal is in the appropriate range. The A/D converter 204 converts the analog image signal output from the analog signal processing section 203 into a digital image signal.

Image data (mosaic image data) for each pixel of RGB output through the image sensor 201, the analog signal processing section 203, and the A/D converter 204 at the time of imaging the static image or the video is input from the image input controller 205 to the RAM 207 and is temporarily stored.

In a case where the image sensor 201 is the CMOS type image sensor, the analog signal processing section 203 and the A/D converter 204 are often built in the image sensor 201.

The digital signal processing section 206 performs various types of digital signal processing on the image data stored in the RAM 207. The digital signal processing section 206 reads the image data stored in the RAM 207 as appropriate and performs offset processing, gain control processing including sensitivity correction, gamma correction processing, demosaicing, and digital signal processing such as RGB/YCrCb conversion processing on the read image data and stores the image data after the digital signal processing in the RAM 207 again. The demosaicing is processing of, for example, calculating color information of all the RGB for each pixel from a mosaic image consisting of RGB in a case of the image sensor consisting of the color filters of RGB three colors, and generates demosaiced image data of RGB three planes from mosaic data (dot-sequential RGB data).

The RGB/YCrCb conversion processing is processing of converting the demosaiced RGB data into brightness data (Y) and color difference data (Cb and Cr).

The compression/expansion processing section 208 performs compression processing on uncompressed brightness data Y and color difference data Cb and Cr once stored in the RAM 207 at the time of recording the static image or the video. In a case of the static image, the static image is compressed in the joint photographic coding experts group (JPEG) format, for example. In a case of the video, for example, the video is compressed by an H.264/advanced video coding (AVC) method, which is one of MPEG encoding methods, for example. The image data compressed by the compression/expansion processing section 208 is recorded in the memory card 212 through the media control section 210. The compression/expansion processing section 208 performs expansion processing on the compressed image data obtained from the memory card 212 through the media control section 210 in the playback mode to generate uncompressed image data.

Details of the compression/expansion processing section 208 (particularly, compression processing section) according to the present invention will be described below.

The media control section 210 controls the recording of the image data compressed by the compression/expansion processing section 208 in the memory card 212. The media control section 210 also controls reading of the compressed image data from the memory card 212.

The display control section 214 controls displaying of the uncompressed image data stored in the RAM 207 on the liquid crystal monitor 216. The liquid crystal monitor 216 is constituted of a liquid crystal display device, but may be constituted of a display device such as organic electroluminescence instead of the liquid crystal monitor 216.

In a case where the live view image is displayed on the liquid crystal monitor 216, the digital image signals continuously generated by the digital signal processing section 206 are temporarily stored in the RAM 207. The display control section 214 converts the digital image signals temporarily stored in the RAM 207 into a signal format for display and sequentially outputs the converted signals to the liquid crystal monitor 216. Accordingly, the captured image is displayed on the liquid crystal monitor 216 in real time, and thus the liquid crystal monitor 216 can be used as an electronic viewfinder.

The shutter release switch 22 is an imaging instruction section to which an instruction to image the static image or the video is input and is constituted of a two-Step Stroke type switch consisting of so-called "half-way pressing" and "full-way pressing".

In a case of the static image imaging mode, an S1 ON signal is output by pressing the shutter release switch 22 halfway, and an S2 ON signal is output by pressing the shutter release switch 22 fully, by further pressing the switch from the half-way pressing. The body-side CPU 220 executes imaging preparation processing such as AF control (automatic focus adjustment) and AE control (automatic exposure control) in a case where the S1 ON signal is output, and executes imaging processing and recording processing of the static image in a case where the S2 ON signal is output.

It is needless to say that the AF and the AE are automatically performed in a case where an auto mode is set by the operation section 222, and are not performed in a case where a manual mode is set.

In a case of the video capturing mode (the first video capturing mode for normal video or the second video capturing mode for static image extraction), in the case where the S2 ON signal is output by pressing the shutter release switch 22 fully, the camera body 200 enters a video recording mode in which the recording of the video is started to execute the image processing and the recording processing of the video. Thereafter, in a case where the S2 ON signal is output by pressing the shutter release switch 22 fully again, the camera body 200 enters a standby state to temporarily stop the recording processing of the video.

The shutter release switch 22 is not limited to the two-Step Stroke type switch consisting of half-way pressing and full-way pressing. The S1 ON signal and the S2 ON signal may be output by one operation or by a separate switch provided for each.

In a form in which an operation instruction is issued using a touch panel or the like, the operation instruction may be output by touching a region corresponding to the operation instruction displayed on a screen of the touch panel as an operation unit thereof. The form of the operation unit is not limited to these as long as an instruction to perform the imaging preparation processing or the imaging processing is issued.

The static image or video acquired by the imaging is compressed by the compression/expansion processing section 208. The compressed image data is converted into an image file in which necessary additional information of imaging date/time, GPS information, imaging conditions (F value, shutter speed, ISO sensitivity, and the like) is added to a header and then stored in the memory card 212 through the media control section 210.

The body-side CPU 220 integrally controls the entire operation of the camera body 200, the driving of the optical member of the interchangeable lens 100, and the like. The body-side CPU 220 controls each section of the camera body 200 and the interchangeable lens 100 based on the inputs from the operation section 222 including the shutter release switch 22 and the like.

The clock section 224 measures time based on the command from the body-side CPU 220 as a timer. The clock section 224 measures a current date and time as a calendar.

The flash ROM 226 is a readable and writable non-volatile memory and stores setting information.

The ROM 228 stores a camera control program executed by the body-side CPU 220, an image processing program according to the present invention, defect information of the image sensor 201, and various parameters or tables used for image processing and the like. The body-side CPU 220 controls each section of the camera body 200 and the interchangeable lens 100 according to the camera control program or the image processing program stored in the ROM 228 while using the RAM 207 as a work region.

In a case where the image sensor 201 includes a phase difference pixel, the AF control section 230 functioning as an automatic focus adjustment section calculates a defocus amount necessary for controlling phase difference AF and notifies the interchangeable lens 100, through the body-side CPU 220 and the body-side communication section 250, of a command of position (focus position) where the focus lens is required to be moved based on the calculated defocus amount.

The position command of the focus lens corresponding to the defocus amount calculated by the AF control section 230 is notified to the interchangeable lens 100, and the lens-side CPU 120 of the interchangeable lens 100, which receives the position command of the focus lens, moves the focus lens through the focus lens control section 116 to control the position (focus position) of the focus lens. The AF control section 230 is not limited to control the phase difference AF and may control contrast AF in which the focus lens is moved such that contrast of an AF region is maximized.

The AE control section 232 is a part that detects brightness of the subject (subject brightness) and calculates a numerical value (exposure value (EV value)) necessary for AE control and auto white balance (AWB) control corresponding to the subject brightness. The AE control section 232 calculates the EV value based on the brightness of the image acquired through the image sensor 201 and the shutter speed and F value at the time of acquiring the brightness of the image.

The body-side CPU 220 can determine the F value, the shutter speed, and the ISO sensitivity from a predetermined program diagram based on the EV value obtained from the AE control section 232, and thus can perform the AE control.

The white balance correction section 234 calculates white balance gains (WB gains) of Gr, Gg, and Gb for each color data of the RGB data (R data, G data, and B data) and multiplies the R data, the G data, and the B data by the calculated WB gains of Gr, Gg, and Gb, respectively, to perform the white balance correction. As a method of calculating the WB gains of Gr, Gg, and Gb, a method is conceivable in which a light source type that illuminates the subject is specified based on scene recognition (outdoor/indoor determination or the like) by the brightness (EV value) of the subject, color temperature of ambient light, and the like and a WB gain corresponding to the specified light source type is read out from the storage section that stores an appropriate WB gain in advance for each light source type. Another known method is conceivable in which at least the EV value is used to obtain the WB gains of Gr, Gg, and Gb.

The wireless communication section 236 is a part that performs short-distance wireless communication of standards such as wireless fidelity (Wi-Fi) (registered trademark) and Bluetooth (registered trademark), and transmits and receives necessary information to and from peripheral digital devices (portable terminal such as smartphone).

The GPS receiving section 238 receives GPS signals transmitted from a plurality of GPS satellites in response to the instruction from the body-side CPU 220 and executes positioning calculation processing based on the plurality of received GPS signals to acquire GPS information consisting of latitude, longitude, and altitude of the camera body 200. The acquired GPS information can be recorded in the header of the image file as additional information indicating an imaging position of the captured image.

The power control section 240 provides a power voltage supplied from the battery 242 to each section of the camera body 200 according to the command from the body-side CPU 220. The power control section 240 provides the power voltage supplied from the battery 242 to each section of the interchangeable lens 100 through the body mount 260 and the lens mount 160 according to the command from the body-side CPU 220.

The lens power switch 244 switches on and off the power voltage provided to the interchangeable lens 100 through the body mount 260 and the lens mount 160 and switches a level according to the command from the body-side CPU 220.

The body-side communication section 250 transmits and receives (bidirectional communication) a request signal and a reply signal to and from the lens-side communication section 150 of the interchangeable lens 100 connected through the body mount 260 and the lens mount 160 according to the command from the body-side CPU 220. The body mount 260 is provided with a plurality of terminals 260A as shown in FIG. 1. In a case where the interchangeable lens 100 is attached to the camera body 200 (the lens mount 160 and the body mount 260 are connected), the plurality of terminals 260A (FIG. 1) provided on the mount 260 and a plurality of terminals (not shown) provided on the lens mount 160 are electrically connected to each other. Therefore, the bidirectional communication is possible between the body-side communication section 250 and the lens-side communication section 150.

The built-in flash 30 (FIG. 1) is, for example, a flash of a through the lens (TTL) automatic dimming system and is constituted of the flash light emission section 270 and the flash control section 272.

The flash control section 272 has a function of adjusting an amount of light emission (guide number) of flash light emitted from the flash light emission section 270. In other words, the flash control section 272 preliminary emits (dimming emission) flash light having a small amount of light emission from the flash light emission section 270 in synchronization with a flash imaging instruction from the body-side CPU 220, determines an amount of light emission of the flash light to be mainly emitted based on reflected light (including ambient light) incident through the imaging optical system 102 of the interchangeable lens 100, and emits (main emission) the flash light having the determined amount of light emission from the flash light emission section 270.

The FPS 280 constitutes a mechanical shutter of the imaging device 10 and is disposed immediately in front of the image sensor 201. The FPS control section 296 controls the opening and closing of front and rear curtains of the FPS 280 based on the input information (S2 ON signal, shutter speed, and the like) from the body-side CPU 220 to control the exposure time (shutter speed) in the image sensor 201.

Next, the compression/expansion processing section 208 in which the first video capturing mode or the second video capturing mode is set and a video captured in the first video capturing mode or the second video capturing mode is compressed will be described.

First Embodiment

Figure 4:
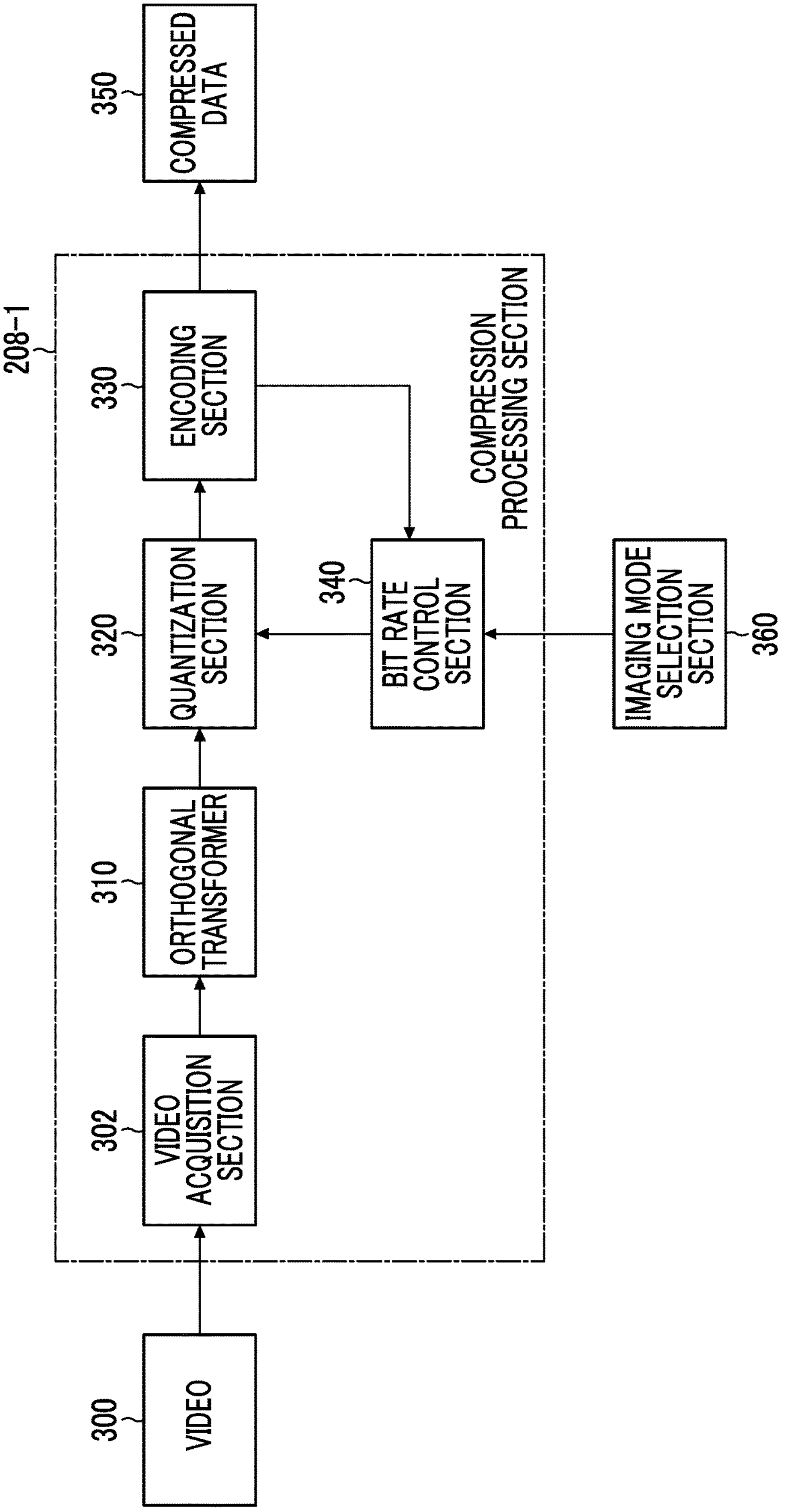
FIG. 4 is a block diagram showing a first embodiment of an image processing device according to the present invention.

FIG. 4 is a block diagram showing a first embodiment of the image processing device according to the present invention and particularly shows a compression processing section of the compression/expansion processing section 208 in the camera body 200.

A compression processing section 208-1 shown in FIG. 4 is mainly constituted of a video acquisition section 302, an orthogonal transformer 310, a quantization section 320, an encoding section 330, and a bit rate control section 340. In the compression processing section 208-1 of the present example, the compression is performed by the H.264/AVC method, which is one of MPEG encoding methods.

In the MPEG compression method, compression, editing, and the like are performed in an one group of pictures (GOP) unit, which is a set of several frames (for example, 15 frames) of a video. The one GOP includes an intra (I) frame in which only information of its own frame is compressed and correlation information with other temporally preceding and following frames is not used, a predictive (P) frame represented by correlation information from a temporally past frame, and a bidirectionally (B) frame represented by correlation information from temporally preceding and following frames. A head frame of the one GOP is at least the I-frame.

The compression processing section 208-1 shown in FIG. 4 is a part that performs the compression processing on a normal video or a video 300 for static image extraction imaged by the video capturing section (such as the interchangeable lens 100 and the image sensor 201 of the camera body 200) of the imaging device 10.

The video acquisition section 302 of the compression processing section 208-1 is a part that acquires image data of a frame constituting the video 300 imaged by the video capturing section. In this example, it is assumed that the I-frame, the P-frame, and the B-frame constituting the one GOP are sequentially acquired to simplify description.

Each frame constituting the one GOP is encoded in a macroblock unit of 16×16 pixels. The brightness data Y and the color difference data Cb and Cr of one macroblock are, for example, converted into four blocks of brightness data Y of 8×8 pixels in a format of Y:Cr:Cb=4:1:1 and one block of color difference data Cr and Cb each thinned out to 8×8 pixels, and then quantization processing is performed for each block (unit block).

The orthogonal transformer 310 orthogonally transforms data of a unit block of 8×8 pixels according to a method called discrete cosine transform (DCT) to decompose the data into a frequency component and calculates an orthogonal transform coefficient.

The quantization section 320 quantizes the orthogonal transform coefficient transformed by the orthogonal transformer 310 based on a quantization parameter (QP value) determined (set) by the bit rate control section 340.

In the H.264/AVC, the QP value is defined in a range of 1 to 51. In a case where the QP value is determined within this range, a quantization Step Size ($Q_{step}$) corresponding to the QP value is determined. The $Q_{step}$ is a value that divides the orthogonal transform coefficient performed in the quantization processing. In the H.264/AVC, the $Q_{step}$ is a value that doubles in a case where the QP value increases by 6 and can be derived using a lookup table or by calculation based on the determined QP value.

Quality and a bit rate of a compressed bit stream are mainly determined by the QP value selected to quantize each macroblock. The $Q_{step}$ corresponding to the QP value is a numerical value for adjusting how much spatial detail is held in the compressed macroblock.

The smaller the $Q_{step}$, the more detail is held and the better the image quality, but the higher the bit rate. As the $Q_{step}$ increases, less detail is held and the bit rate is reduced, but the image quality deteriorates. Therefore, the bit rate control section 340 needs to determine the QP value ($Q_{step}$) in consideration of the image quality and the bit rate.

A method of determining the QP value by the bit rate control section 340 will be described below.

The encoding section 330 is a part that entropy-encodes a quantized value supplied from the quantization section 320. In the H.264/AVC, it is possible to select any one of variable length coding (VLC) based on Huffman code or arithmetic coding. A compressed data 350 (encoded data) further compressed by the encoding section 330 is transmitted to the media control section 210 (FIG. 3) as the bit stream. The media control section 210 functions as a video recording section that records the compressed data of the compressed normal video and the compressed video for static image extraction in the memory card 212.

The bit rate control section 340 has a function as a video buffering verifier (VBV) buffer, acquires the encoded data (amount of generated code) after the quantization of the image data of the past frame of the video output from the encoding section 330, for example, in the macroblock unit, calculates a VBV buffer occupation amount from the acquired amount of generated code and a bit rate set in advance of the bit stream to determine a QP value at which the VBV buffer does not fail. The bit rate control section 340 outputs the determined QP value to the quantization section 320.

The bit rate control section 340 may output the quantization Step Size ($Q_{step}$) corresponding to the QP value to the quantization section 320 instead of the determined QP value. The bit rate control section 340 may determine the QP value in frame unit or GOP unit.

The quantization section 320 acquires the $Q_{step}$ corresponding to the QP value input from the bit rate control section 340 or directly acquires the $Q_{step}$ from the bit rate control section 340 and divides the orthogonal transform coefficient by the $Q_{step}$ to calculate the quantized value rounded to an integer.

Next, a method of determining the QP value by the bit rate control section 340 will be described in further detail.

As shown in FIG. 4, an imaging mode command indicating the first video capturing mode for normal video or the second video capturing mode for static image extraction is added to the bit rate control section 340 from the imaging mode selection section 360.

In the present example, the imaging mode selection section 360 is an on-screen interactive operation section that uses the MENU/OK key 27, the cross key 28, the liquid crystal monitor 216, and the like, but may be a mode dial for selecting various imaging modes.

In a case where an instruction to image the video is input from the shutter release switch 22 in a state where the first video capturing mode is selected by the imaging mode selection section 360, the imaging device 10 captures the video (normal video) under the imaging condition suitable for viewing the video. On the other hand, in a case where the instruction to image the video is input from the shutter release switch 22 in a state where the second video capturing mode is selected by the imaging mode selection section 360, the imaging device 10 captures the video (video for static image extraction) under the imaging condition suitable for extracting the static image.

For example, the shutter speed differs between the imaging conditions of the video for static image extraction and the normal video. The shutter speed of each frame of the video for static image extraction is set higher than that of the normal video.

This is because it is preferable to set the shutter speed such that camera shake or image blur does not occur in each frame in the case of the video for static image extraction. On the other hand, it is preferable to set the shutter speed corresponding to the frame interval determined by the frame rate in order to ensure the continuity of each frame in the case of the normal video. It is preferable to increase the tracking speed of AF, AE, and AWB as much as possible in the case of the video for static image extraction. On the other hand, it is preferable to slow down the tracking speed of AF, AE, and AWB in the case of the normal video. In the case of the video for static image extraction, it is preferable to increase the frame rate (increase the number of frames per unit time) as compared with the normal video in order to capture a momentary scene.

The bit rate control section 340 makes a range (lower limit value and upper limit value) of the QP value different between a case where the imaging mode command indicating the first video capturing mode is added from the imaging mode selection section 360 and a case where the imaging mode command indicating the second video capturing mode is added therefrom.

Figure 5:
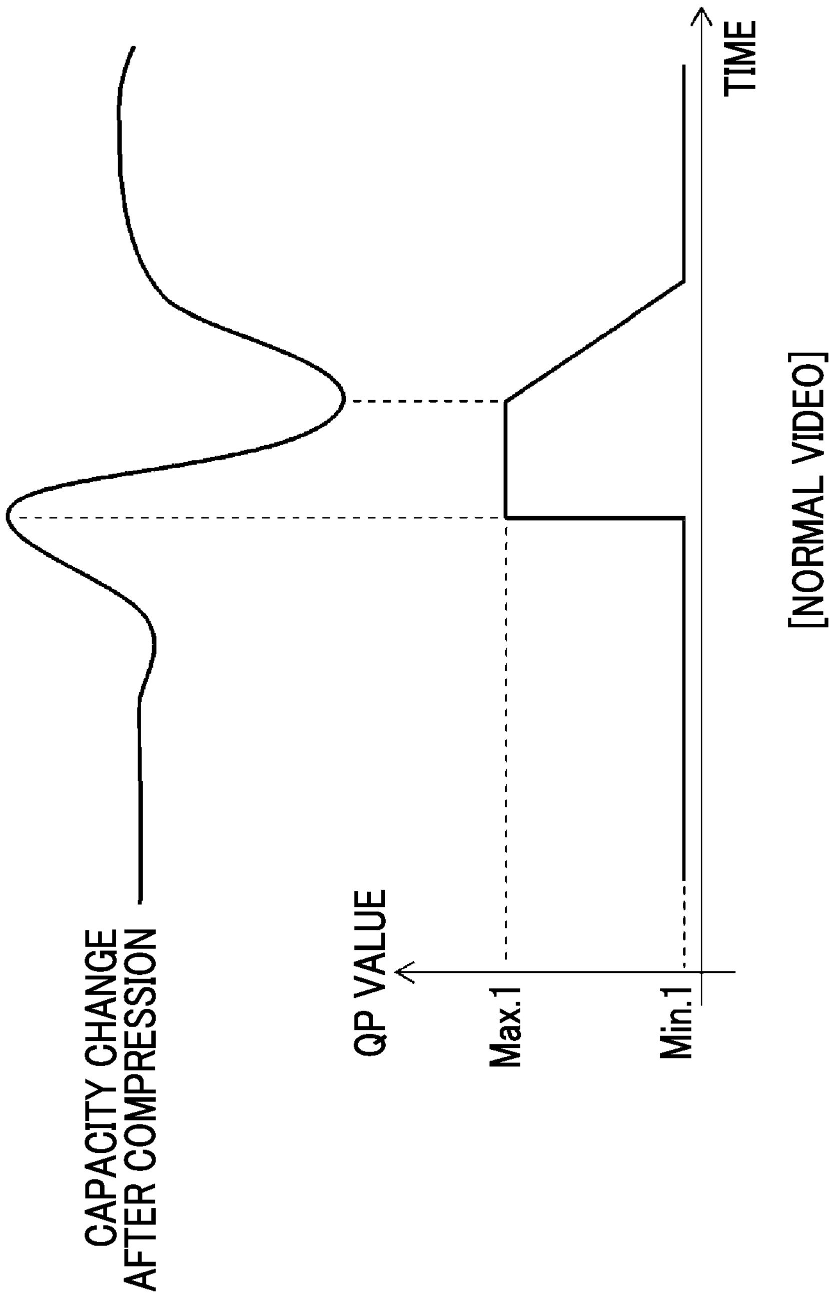
FIG. 5 is a schematic diagram showing a relationship between a change in an amount of generated code after quantization of image data of a past frame and a QP value in a case where compression processing is performed on a normal video.

FIG. 5 is a schematic diagram showing a relationship between a change in the amount of generated code after the quantization of the image data of the past frame and the QP value in a case where compression processing is performed on the normal video.

As shown in FIG. 5, the bit rate control section 340 determines the QP value used for the quantization of the normal video within a range between a first lower limit value (Min.1) and a first upper limit value (Max.1). In the case of the H.264/AVC, a possible maximum range of the QP value is 1 to 51. Therefore, Min.1 and Max.1 are set within the range of 1 to 51. It is preferable to set Min.1 and Max.1 in consideration of the image quality of the entire video.

As shown in FIG. 5, in a case where the QP value is set to Min.1, in a case where a frame or a GOP of a movement scene such as a scene change is quantized, the amount of generated code after the quantization increases rapidly. In this case, the bit rate control section 340 increases the QP value such that the VBV buffer does not fail (the VBV buffer occupation amount overflows).

In the example shown in FIG. 5, in a case where the amount of generated code increases rapidly, the QP value is changed from Min.1 to Max.1.

Thereafter, in a case where the scene changes from the movement scene to a still scene, the amount of generated code after the quantization is rapidly reduced since the QP value is held at Max.1. The bit rate control section 340 reduces the QP value such that the VBV buffer does not fail (the VBV buffer occupation amount underflows) due to the reduction in the amount of generated code.

The normal video is suitable for viewing as the video since Min.1 and Max.1 for the normal video are set in consideration of the image quality of the entire video. However, in a case where one frame is extracted as the static image from the normal video, the QP value for the extracted static image may be too large.

Figure 6:
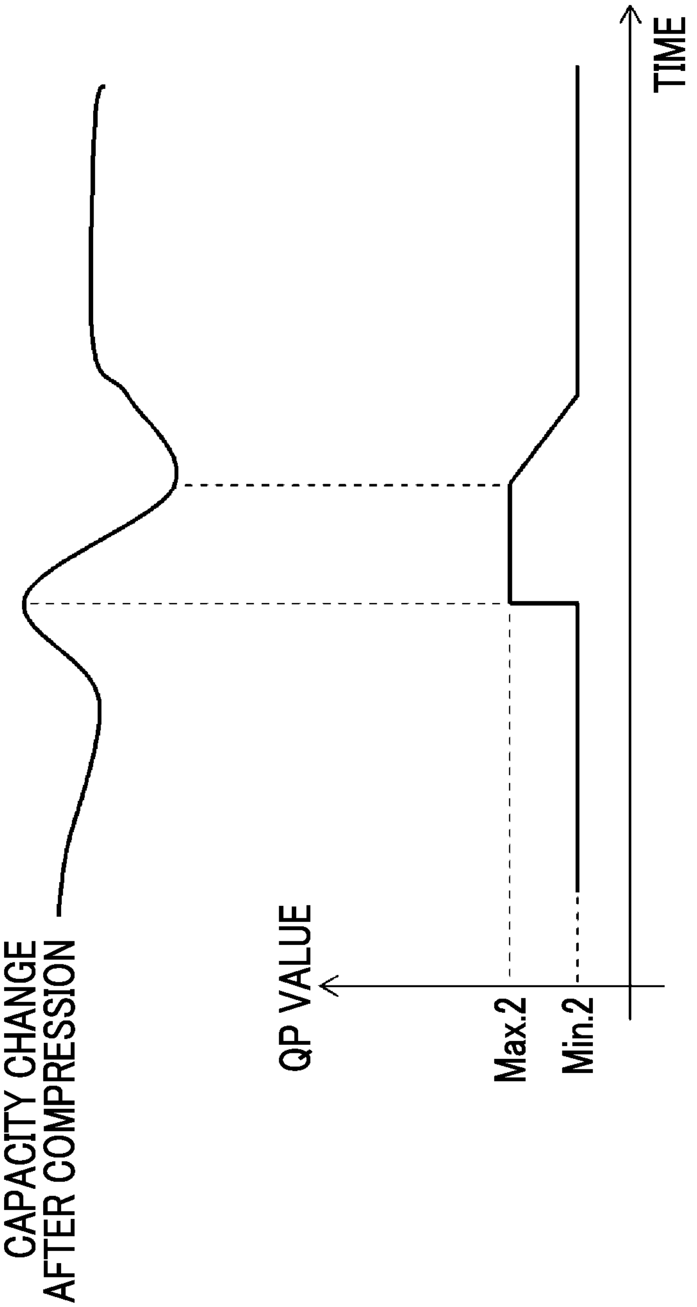
FIG. 6 is a schematic diagram showing a relationship between a change in an amount of generated code after quantization of image data of a past frame and a QP value in a case where the compression processing is performed on a video for static image extraction.

FIG. 6 is a schematic diagram showing a relationship between a change in the amount of generated code after the quantization of the image data of the past frame and the QP value in the case where the compression processing is performed on the video for static image extraction.

As shown in FIG. 6, the bit rate control section 340 determines the QP value used for the quantization of the video for static image extraction within a range (second range) between a second lower limit value (Min.2) and a second upper limit value (Max.2).

Min.2 and Max.2 are respectively set such that a certain image quality (image quality required as the static image) can be guaranteed for all frames of the video for static image extraction and the bit rate is to be the same as that in the case of the normal video.

Specifically, Min.2 is set to a value larger than Min.1. Min.2 is set such that the amount of generated code after the quantization is not significantly increased in the case where the frame or the GOP of the movement scene such as the scene change is quantized.

With the setting of Min.2, which is larger than Min.1, it is possible to suppress the increase in the amount of generated code after the quantization as compared with the case where Min.1 is set.

On the other hand, Max.2 is set to a value smaller than Max.1. Max.2 is set to a value that allows even in a frame in which Max.2 is used as the QP value used for the quantization to hold a desired image quality as the static image.

As shown in FIG. 6, in a case where the QP value is set to Min.2, which is larger than Min.1, the amount of generated code after the quantization is suppressed as compared with the normal video in the still scene or the like. As a result, it is possible to suppress the rapid increase even in the case where the frame or the GOP of the movement scene such as the scene change is quantized.

In the example shown in FIG. 6, the QP value is changed from Min.2 to Max.2 in a case where the amount of generated code increases, but the increase in the amount of generated code is suppressed. Therefore, it is possible to prevent the VBV buffer from failing (the VBV buffer occupation amount overflows) even with Max.2, which is smaller than Max.1.

In particular, the QP value can be limited to Max.2, which is smaller than Max.1 even at the maximum. Therefore, it is possible to guarantee the image quality required as the static image for all the frames of the video for static image extraction.

Second Embodiment

Figure 7:
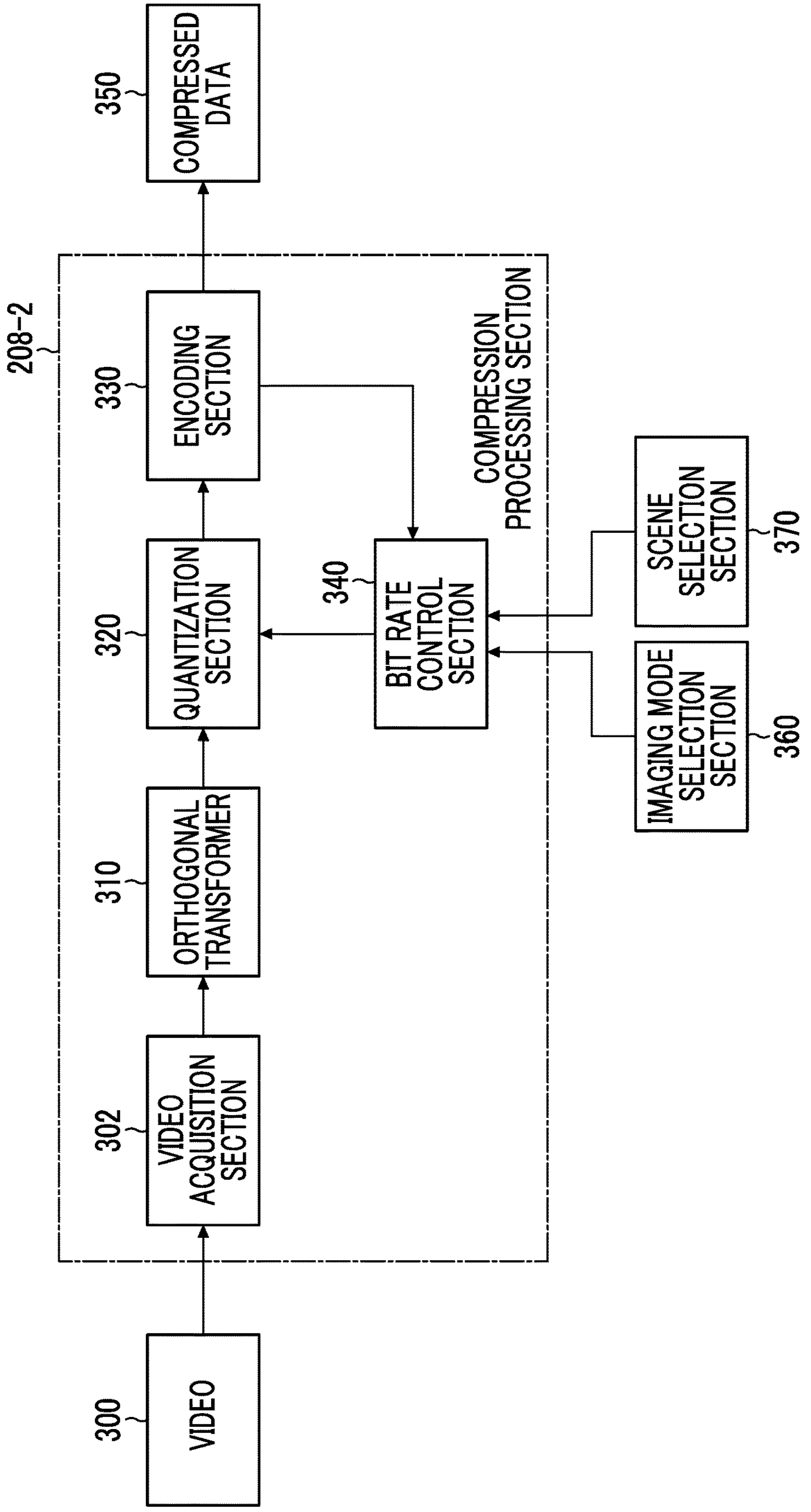
FIG. 7 is a block diagram showing a second embodiment of the image processing device according to the present invention.

FIG. 7 is a block diagram showing a second embodiment of the image processing device according to the present invention, and particularly showing the compression processing section of the compression/expansion processing section 208 in the camera body 200. In the second embodiment shown in FIG. 7, the same reference numeral is assigned to a part common to that of the first embodiment shown in FIG. 4 and detailed description thereof will be omitted.

A compression processing section 208-2 shown in FIG. 7 is different from the compression processing section 208-1 according to the first embodiment shown in FIG. 4 mainly in that the scene discrimination section that discriminates a scene of the video for static image extraction is included.

The scene discrimination section is a part that discriminates an imaging scene based on scene information from the scene selection section 370 that selects the imaging scene such as scenery, night view, sunset, macro, person, moving body, sports, and the like. The bit rate control section 340 may function as the scene discrimination section or a scene discrimination section independent of the bit rate control section 340 may be provided. The scene discrimination section may analyze the live view image and automatically discriminate the imaging scene based on the analysis result.

The bit rate control section 340 sets the range (second range) of selectable QP values according to the scene information indicating the imaging scene of the video discriminated by the scene discrimination section in a case where the second video capturing mode for static image extraction is set. For example, Min.2 and Max.2 recorded corresponding to the scene information are read out according to the scene information from a table in which a relationship between the scene information and Min.2 and Max.2 is recorded, and thus the second range of the QP values defined by Min.2 and Max.2 can be set.

It is needless to say that Min.2 set according to the imaging scene of the video is larger than Min.1 of the QP value of the normal video and Max.2 is smaller than Max.1 of the QP value of the normal video. The bit rate control section 340 may set the range (first range) of selectable QP values according to the scene information indicating the imaging scene of the video discriminated by the scene discrimination section in a case where the first video capturing mode for normal video is set.

As the scene discrimination and the range of the QP value set by the scene discrimination result, for example, the imaging scene such as presence or absence of a wind or a moving body may be discriminated from the video and the range of QP value may be determined by determining whether or not the scene is a “momentarily changing scene” from the discrimination result. Further, a “momentary change cutout mode” and a “normal cutout mode (mode other than the momentary change cutout mode)” are provided as the second video capturing mode for static image extraction. In a case where the user selects the “momentary change cutout mode”, the range (second range) of the QP value may be narrower than in the “normal cutout mode”.

In the second video capturing mode, the second range of the QP value may be shifted according to the frame rate (the QP value is shifted to a higher side as the frame rate is higher).

[Table 1] shows an example of the lower limit value and the upper limit value of the QP value.

[Table 1][0142] [About Scene Discrimination]

As a scene in which the scene changes rapidly, for example, lightning imaging can be considered.

In a case where videos of frames having the same composition continue, the QP value gradually decreases in the frames having the same composition and the compression ratio of the image decreases. In this case, in a case where the scene changes rapidly, there is a concern that the compression ratio cannot be achieved and the QP value increases.

Therefore, it is preferable to provide the “momentary change cutout mode” as the second video capturing mode for static image extraction and further narrow a width of the QP value as compared with the “normal cutout mode”.

[About Frame Rate]

In a case where the frame rate changes from 30 fps to 60 fps, the amount of data simply doubles.

In a case where the frame rate increases, it is preferable that the range of the QP value is shifted (the lower limit value and the upper limit value are increased) according to the increased frame rate. Accordingly, the bit rates after the compression of 30 fps and 60 fps can be made the same, and deterioration of image quality can be suppressed even in a case where the frame rate is changed from 30 fps to 60 fps.

The second range of the QP value in the second video capturing mode is not limited to the upper limit value and the lower limit value of the QP value shown in [Table 1] and may be set as appropriate in response to an input from an instruction input section that receives an instruction from the outside.

[Image Processing Method]

Figure 8:
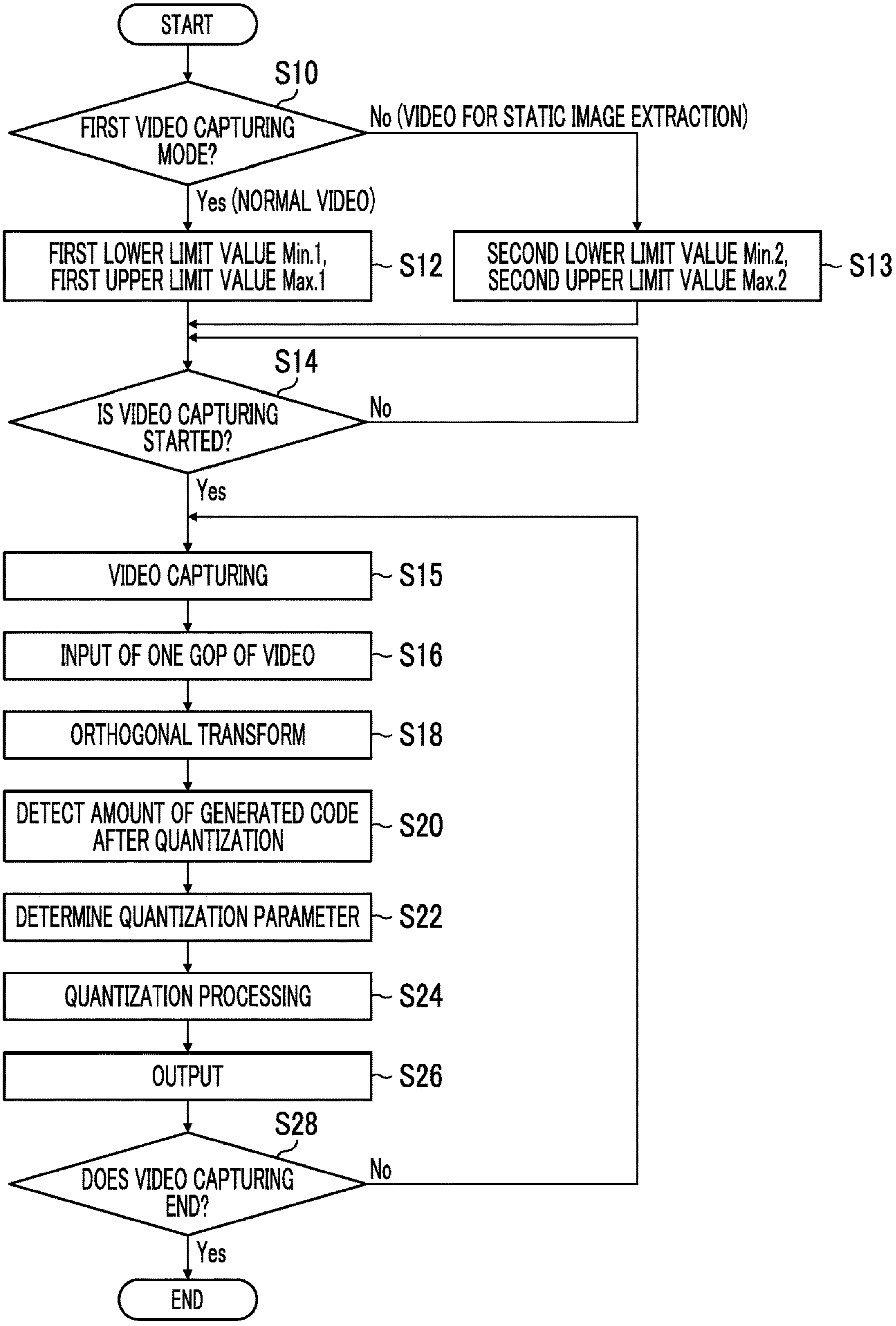
FIG. 8 is a flowchart showing an embodiment of an image processing method according to the present invention.

FIG. 8 is a flowchart showing an embodiment of the image processing method according to the present invention. Hereinafter, a processing operation of each section of the compression processing section 208-1 shown in FIG. 4 will be mainly described.

In FIG. 8, the bit rate control section 340 discriminates whether the first video capturing mode for normal video or the second video capturing mode for static image extraction is selected by the imaging mode command input from the imaging mode selection section 360 (Step S10).

In a case where the first video capturing mode is selected, the first range (first lower limit value Min.1 and first upper limit value Max.1) of the quantization parameter (QP value) for normal videos is set (Step S12). In a case where the second video capturing mode is selected, the second range (second lower limit value Min.2 and second upper limit value Max.2) of the QP value for static image extraction is set (Step S13). Min.2 is a value larger than Min.1, and Max.2 is a value smaller than Max.1. In Step S14, a step of discriminating the scene of the video for static image extraction by the scene discrimination section may be included and the second range may be set according to the discriminated scene.

Subsequently, the body-side CPU 220 of the imaging device 10 discriminates whether or not the video capturing is started based on an input signal from the operation section 222 (shutter release switch 22) (Step S14).

In a case where discrimination is made that the video capturing is started in Step S14, the body-side CPU 220 causes the video capturing section to image the video in the first video capturing mode or the second video capturing mode (Step S15, video acquisition step).

Subsequently, the video captured by the video capturing section is compressed or the like in the one GOP unit by the H.264/AVC method, which is one of MPEG encoding methods (compression processing step).

That is, in a case where the video capturing is started, the video acquisition section 302 of the compression processing section 208-1 sequentially acquires each frame (I-frame, P-frame, and B-frame constituting one GOP) of the normal video or the video for static image extraction (Step S16).

For each frame, the compression processing is performed for each unit block of 8×8 pixels. The orthogonal transformer 310 performs the discrete cosine transform (DCT) on the data of the unit block to calculate the orthogonal transform coefficient (Step S18).

The bit rate control section 340 having a function as the VBV buffer acquires the encoded data (the amount of generated code after the quantization of the image data of the past frame of the video) output from the encoding section 330, for example, in the macroblock unit (Step S20). The bit rate control section 340 calculates the VBV buffer occupation amount from the acquired amount of generated code and the bit rate set in advance of the bit stream to determine the quantization parameter (QP value) at which the VBV buffer does not fail (Step S22).

The QP value in Step S22 is determined within the first range (first lower limit value Min.1 and first upper limit value Max.1) set in Step S12 in a case where the video currently being compressed is the normal video, and is determined within the second range (second lower limit value Min.2 and second upper limit value Max.2) set in Step S13 in a case where the video currently being compressed is the video for static image extraction.

The quantization section 320 divides the orthogonal transform coefficient input from the orthogonal transformer 310 by the quantization Step Size ($Q_{step}$) corresponding to the QP value determined by the bit rate control section 340 to calculate the quantized value rounded to the integer (Step S24).

Steps S18 to S24, in which the QP value is determined within the first range set in Step S12 and the frame of the video is quantized and compressed for each unit block, correspond to a first compression step of compressing the normal video. Steps S18 to S24, in which the QP value is determined within the second range set in Step S13 and the frame of the video is quantized and compressed for each unit block, correspond to a second compression step of compressing the video for static image extraction.

The quantized value calculated by the quantization section 320 is entropy-encoded by the encoding section 330, output to the media control section 210 (FIG. 3) as the bit stream, and is recorded in the memory card 212 as the normal video or the video for static image extraction by the media control section 210 (Step S26).

Subsequently, the body-side CPU 220 of the imaging device 10 discriminates whether or not the video capturing ends based on the input signal from the operation section 222 (Step S28). In a case where discrimination is made that the video capturing does not end (in a case of "No"), the processing proceeds to Step S15. Accordingly, the video capturing, the compression processing, the recording processing, and the like are continuously performed. In a case where discrimination is made that the video capturing ends (in a case of "Yes"), the image processing ends.

The imaging device 10 according to the present embodiment is the mirrorless digital single-lens camera, but is not limited thereto and may be a single-lens reflex camera, a lens-integrated imaging device, a digital video camera, or the like. The imaging device 10 is also applicable to a mobile device having functions (calling function, communication function, and other computer functions) other than the imaging, in addition to the imaging function. Examples of other aspects to which the present invention can be applied include a portable phone or smartphone having a camera function, a personal digital assistant (PDA), and a portable game machine. Hereinafter, an example of the smartphone to which the present invention can be applied will be described.

<Configuration of Smartphone>

Figure 9:
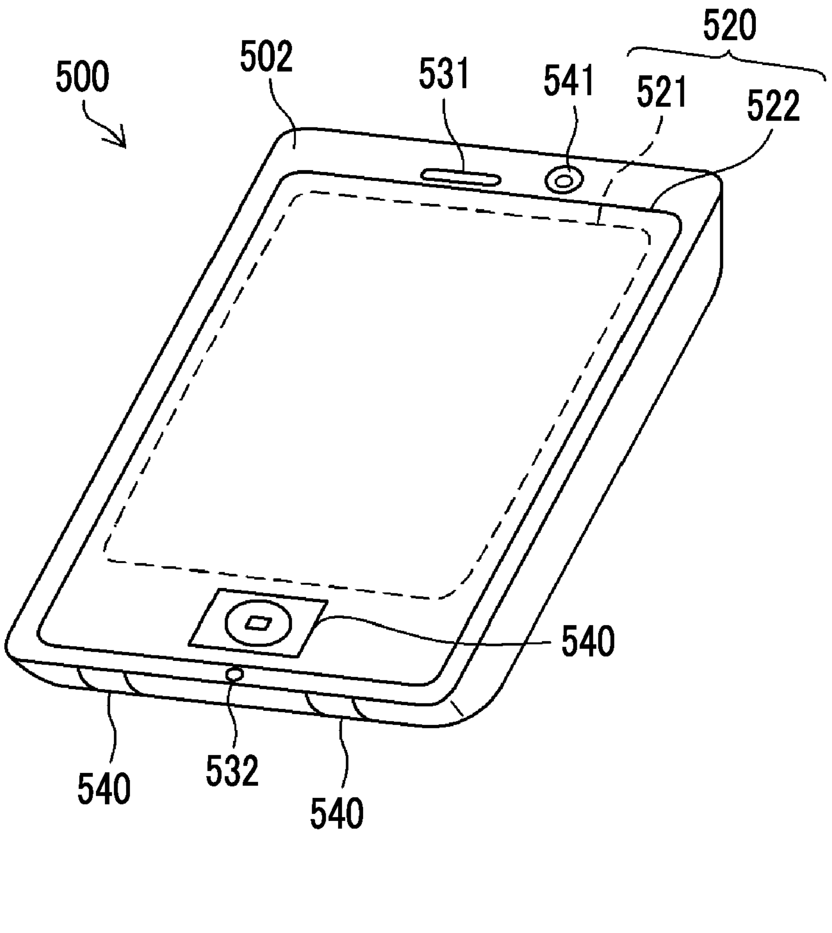
FIG. 9 is an external view of a smartphone that is an embodiment of the imaging device according to the present invention.

FIG. 9 shows an appearance of a smartphone 500 which is an embodiment of the imaging device of the present invention. The smartphone 500 shown in FIG. 9 has a flat housing 502 and comprises a display and input section 520 in which a display panel 521 as a display section and an operation panel 522 as an input section are integrated on one surface of the housing 502. The housing 502 comprises a speaker 531, a microphone 532, an operation section 540, and a camera section 541. A configuration of the housing 502 is not limited thereto. For example, a configuration in which the display section and the input section are independent or a configuration having a folding structure or a slide mechanism can be employed.

Figure 10:
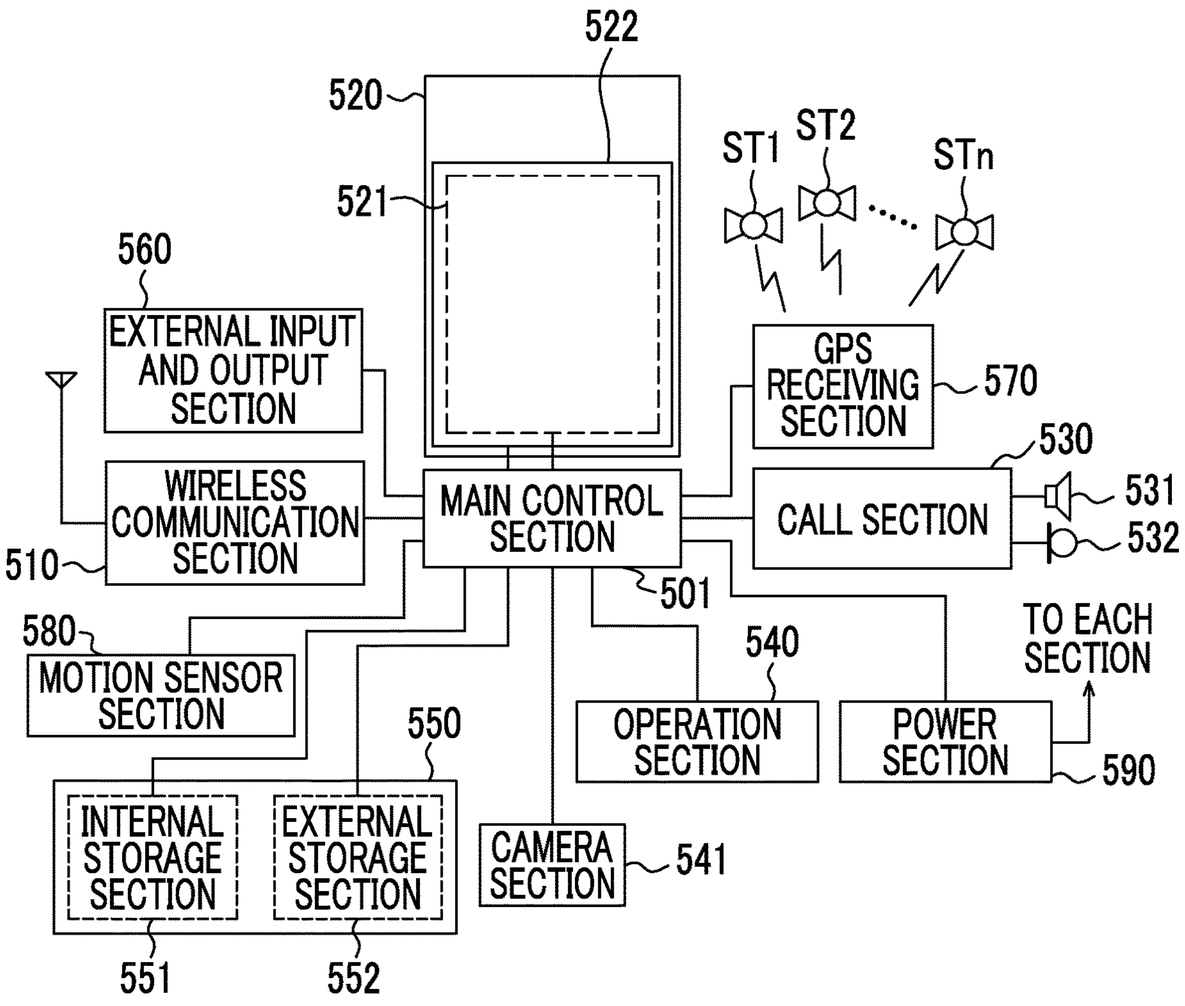
FIG. 10 is a block diagram showing a configuration of the smartphone.

FIG. 10 is a block diagram showing a configuration of the smartphone 500 shown in FIG. 9. As shown in FIG. 10, a wireless communication section 510 that performs mobile wireless communication through a base station and a mobile communication network, a display and input section 520, a call section 530, an operation section 540, a camera section 541, a recording section 550, an external input and output section 560, a global positioning system (GPS) receiving section 570, a motion sensor section 580, a power section 590, and a main control section 501 are provided as main components of the smartphone.

The wireless communication section 510 performs the wireless communication with the base station accommodated in the mobile communication network in response to an instruction from the main control section 501. Using this wireless communication, various pieces of file data such as voice data and image data, e-mail data, and the like are transmitted and received, and Web data, streaming data, and the like are received.

The display and input section 520 is a so-called touch panel in which the image (static image and video image), character information, or the like is displayed to visually transmit information to the user and a user operation on the displayed information is detected under control of the main control section 501, and comprises a display panel 521 and an operation panel 522.

The display panel 521 uses a liquid crystal display (LCD), an organic electro-luminescence display (OELD), or the like as the display device. The operation panel 522 is a device that is placed such that an image displayed on a display surface of the display panel 521 is visually recognizable and detects one or a plurality of coordinates operated by a finger or a stylus of the user. In a case where such a device is operated by the finger or the stylus of the user, a detection signal generated due to the operation is output to the main control section 501. Next, the main control section 501 detects an operation position (coordinates) on the display panel 521 based on the received detection signal.

As shown in FIG. 9, although the display panel 521 and the operation panel 522 of the smartphone 500 exemplified as an embodiment of the imaging device according to the present invention integrally constitute the display and input section 520, the operation panel 522 is disposed so as to completely cover the display panel 521. In a case where such a disposition is employed, the operation panel 522 may comprise a function of detecting the user operation even in a region outside the display panel 521. In other words, the operation panel 522 may comprise a detection region (hereinafter referred to as display region) for an overlapping portion that overlaps the display panel 521 and a detection region (hereinafter referred to as non-display region) for the other outer edge portion that does not overlap the display panel 521.

A size of the display region and a size of the display panel 521 may be perfectly matched, but the sizes are not necessarily matched. The operation panel 522 may comprise two sensitive regions of the outer edge portion and the other inner portion. Further, a width of the outer edge portion is designed as appropriate according to a size of the housing 502 or the like. Furthermore, examples of a position detection method employed in the operation panel 522 include a matrix switch method, a resistive film method, a surface acoustic wave method, an infrared method, an electromagnetic induction method, and an electrostatic capacitive method, and any method may be employed.

The call section 530 comprises the speaker 531 and the microphone 532. The call section 530 converts a voice of the user input through the microphone 532 into voice data that can be processed by the main control section 501 and output the converted voice data to the main control section 501, and decodes the voice data received by the wireless communication section 510 or the external input and output section 560 and outputs the decoded voice data from the speaker 531. Further, as shown in FIG. 9, it is possible to mount the speaker 531 and the microphone 532 on the same surface as a surface on which the display and input section 520 is provided.

The operation section 540 is a hardware key using a key switch or the like and receives the instruction from the user. For example, as shown in FIG. 9, the operation section 540 is a push-button type switch that is mounted on the side surface of the housing 502 of the smartphone 500, is turned on in a case of being pressed with a finger or the like, and is turned off by restoring force of a spring or the like in a case where the finger is released.

The recording section 550 stores a control program or control data of the main control section 501, application software (including the image processing program according to the present invention), address data in which a name, a telephone number, and the like of a communication partner are associated, data of transmitted and received e-mails, Web data downloaded by Web browsing, or downloaded content data, and temporarily stores streaming data or the like. The recording section 550 is constituted of an internal storage section 551 built into the smartphone and an external storage section 562 having an attachable and detachable external memory slot. Each of the internal storage section 551 and the external storage section 552 constituting the recording section 550 is formed by using a recording medium such as a flash memory type, a hard disk type, a multimedia card micro type, a card type memory (for example, MicroSD (registered trademark) memory or the like), a random access memory (RAM), or a read only memory (ROM).

The external input and output section 560 serves as an interface with all external devices connected to the smartphone 500, and is for directly or indirectly connecting to another external device by communication or the like (for example, universal serial bus (USB), IEEE1394, or the like) or a network (for example, Internet, wireless local area network (LAN), Bluetooth (registered trademark), radio frequency identification (RFID), infrared communication (infrared data association: IrDA) (registered trademark), ultra wideband (UWB) (registered trademark), ZigBee (registered trademark), or the like).

Examples of the external device connected to the smartphone 500 include a wired/wireless headset, a wired/wireless external charger, a wired/wireless data port, a memory card (SIM) or a subscriber identity module (SIM)/user identity module (UIM) card connected through a card socket, external audio and video devices connected through audio and video input and output (I/O) terminals, wirelessly connected external audio and video devices, a wired/wirelessly connected smartphone, a wired/wirelessly connected personal computer, a wired/wirelessly connected PDA, and an earphone. The external input and output section can transmit the data transmitted from such an external device to each component inside the smartphone 500 or can transmit the data inside the smartphone 500 to the external device.

The GPS receiving section 570 receives GPS signals transmitted from GPS satellites ST1 to STn in response to the instruction from the main control section 501 and executes positioning calculation processing based on the plurality of received GPS signals to detect a position of the smartphone 500 (latitude, longitude, and altitude). In a case where position information can be acquired from the wireless communication section 510 or the external input and output section 560 (for example, wireless LAN), the GPS receiving section 570 can detect the position thereof using the position information.

The motion sensor section 580 comprises, for example, a triaxial acceleration sensor and a gyro sensor, and detects a physical movement of the smartphone 500 in response to the instruction from the main control section 501. With the detection of the physical movement of the smartphone 500, a moving direction or acceleration of the smartphone 500 is detected. The detection result is output to the main control section 501.

The power section 590 supplies electric power accumulated in a battery (not shown) to each section of the smartphone 500 in response to the instruction from the main control section 501.

The main control section 501 comprises a microprocessor and operates according to the control program or the control data stored in the recording section 550 to integrally control each section of the smartphone 500. The main control section 501 has a mobile communication control function for controlling each section of a communication system and an application processing function for performing voice communication or data communication through the wireless communication section 510.

The application processing function is realized by the main control section 501 operating according to the application software stored in the recording section 550. Examples of the application processing function include an infrared communication function that controls the external input and output section 560 to perform data communication with a counterpart device, an e-mail function that transmits and receives e-mail, a web browsing function that browses a Web page, and an image processing function that performs the compression processing according to the present invention.

The main control section 501 also has the image processing function such as displaying a video on the display and input section 520 based on the image data (data of static image or video) such as received data or downloaded streaming data. The image processing function means a function of the main control section 501 decoding the image data described above, performing the image processing on such a decoding result, and displaying an image on the display and input section 520.

Further, the main control section 501 executes display control for the display panel 521 and operation detection control for detecting the user operation through the operation section 540 and the operation panel 522.

With the execution of the display control, the main control section 501 displays an icon for activating the application software, a software key such as a scroll bar, or a window for creating an e-mail. The scroll bar is a software key for receiving an instruction to move a display portion of an image, such as a large image that does not fit in the display region of the display panel 521.

With the execution of the operation detection control, the main control section 501 detects the user operation through the operation section 540, receives an operation for an icon or an input of a character string in an input field of a window through the operation panel 522, or receives a request for scrolling the display image through the scroll bar.

Further, with the execution of the operation detection control, the main control section 501 determines whether the operation position for the operation panel 522 is the overlapping portion (display region) that overlaps the display panel 521 or the other outer edge portion (non-display region) that does not overlap the display panel 521, and has a touch panel control function for controlling the sensitive region of the operation panel 522 or a display position of the software key.

The main control section 501 can also detect a gesture operation for the operation panel 522 and execute a preset function according to the detected gesture operation. The gesture operation does not mean a conventional simple touch operation, but means an operation of drawing a trajectory with a finger or the like, designating a plurality of positions at the same time, or a combination of these to draw the trajectory about at least one from the plurality of positions.

The camera section 541 is a digital camera (imaging device) that performs the imaging electronically using the imaging element such as a complementary metal oxide semiconductor (CMOS) or a charge-coupled device (CCD), and corresponds to the imaging device 10 shown in FIG. 1. The camera section 541 can compress the image data of the static image obtained by the imaging by, for example, joint photographic coding experts group (JPEG) or compress the image data of the video by, for example, H.264/AVC, and record the compressed image data in the recording section 550 or output the compressed image data through the external input and output section 560 or the wireless communication section 510, under the control of the main control section 501. In the smartphone 500 shown in FIG. 9, the camera section 541 is mounted on the same surface as the display and input section 520, but the mounting position of the camera section 541 is not limited thereto. The camera section 541 may be mounted on a back surface of the display and input section 520, or a plurality of camera sections 541 may be mounted. In a case where the plurality of camera sections 541 are mounted, the camera sections 541 to be used for imaging may be switched to perform imaging independently, or the plurality of camera sections 541 may be used at the same time for imaging.

The camera section 541 can be used for various functions of the smartphone 500. For example, it is possible to display the image acquired by the camera section 541 on the display panel 521 or use the image of the camera section 541 as one of operation inputs of the operation panel 522. In a case where the GPS receiving section 570 detects the position, it is possible to detect the position with reference to the image from the camera section 541. Further, it is possible to determine an optical axis direction of the camera section 541 of the smartphone 500 or a current use environment without using the triaxial acceleration sensor or in combination with the triaxial acceleration sensor (gyro sensor) with reference to the image from the camera section 541. Of course, it is possible to use the image from the camera section 541 in the application software.

In addition, the image data of the static image or the video can be recorded in the recording section 550 by adding the position information acquired by the GPS receiving section 570, voice information acquired by the microphone 532 (the voice information may be converted into text information by voice-text conversion by the main control section or the like), posture information acquired by the motion sensor section 580, and the like, or can be output through the external input and output section 560 or the wireless communication section 510.

[Other]

In this embodiment, the H.264/AVC encoding method is described as an example, but the present invention is not limited thereto. The present invention can be applied to a case where the compression is performed by other encoding methods such as MPEG-2 and MPEG-4. For example, in MPEG-2, the QP value is defined in a range of 1 to 31. Therefore, in a case where different ranges (lower limit value and upper limit value) of the QP value are set for the normal video and the video for static image extraction, it is necessary to set the ranges according to the encoding method.

A hardware structure of the processing unit that executes the various pieces of processing in the compression/expansion processing section 208 of the imaging device according to the present invention is the following various processors. The various processors include, for example, a central processing unit (CPU) which is a general-purpose processor that executes software (program) to function as various processing units, a programmable logic device (PLD) which is a processor whose circuit configuration can be changed after manufacturing such as a field programmable gate array (FPGA), and a dedicated circuitry which is a processor having a circuit configuration specifically designed to execute specific processing such as an application specific integrated circuit (ASIC), and the like.

One processing unit may be constituted of one of these various processors or may be constituted of two or more processors of the same type or different types (for example, a plurality of FPGAs or a combination of CPU and FPGA). The plurality of processing units may be constituted of one processor. As an example of constituting the plurality of processing units by one processor, first, there is a form in which one processor is constituted of a combination of one or more CPUs and software, as represented by a computer such as a client or a server, and the one processor functions as the plurality of processing units. Second, there is a form in which a processor that realizes the functions of the entire system including the plurality of processing units by one integrated circuit (IC) chip is used, as represented by a system on chip (SoC) or the like. As described above, the hardware structure for the various processing units is constituted of using one or more of the various processors described above.

Further, the hardware structure of the various processors is, more specifically, circuitry in which circuit elements such as semiconductor elements are combined.

Furthermore, the present invention includes the image processing program that is installed in the imaging device to function as the imaging device according to the present invention and the recording medium in which the image processing program is recorded.

It is needless to say that the present invention is not limited to the embodiments described above and various modifications can be made within a range not departing from the spirit of the present invention.

EXPLANATION OF REFERENCES

10: imaging device
20: viewfinder window
22: shutter release switch
23: shutter speed dial
24: exposure correction dial
25: power lever
26: eyepiece section
27: MENU/OK key
28: cross key
29: playback button
30: built-in flash
100: interchangeable lens
102: imaging optical system
104: lens group
108: stop
116: focus lens control section
118: stop control section
120: lens-side CPU
122: RAM
124: ROM
126: flash ROM
150: lens-side communication section
160: lens mount
200: camera body
201: image sensor
202: image sensor control section
203: analog signal processing section
204: A/D converter
205: image input controller
206: digital signal processing section
207: RAM
208: compression/expansion processing section
208-1, 208-2: compression processing section
210: media control section
212: memory card
214: display control section
216: liquid crystal monitor
220: body-side CPU
222: operation section
224: clock section
226: flash ROM
228: ROM
230: AF control section
232: AE control section
234: white balance correction section
236: wireless communication section
238: GPS receiving section
240: power control section
242: battery
244: lens power switch
250: body-side communication section
260: body mount
260A: terminal
270: flash light emission section
272: flash control section
296: FPS control section
300: video
302: video acquisition section
310: orthogonal transformer
320: quantization section
330: encoding section
340: bit rate control section
350: compressed data
360: imaging mode selection section
370: scene selection section
500: smartphone
501: main control section
502: housing
510: wireless communication section
520: display input section
521: display panel
522: operation panel
530: call section
531: speaker
532: microphone
540: operation section
541: camera section
550: recording section
551: internal storage section
552: external storage section
560: external input and output section
562: external storage section
570: GPS receiving section
580: motion sensor section
590: power section
Max.1: first upper limit value
Max.2: second upper limit value
Min.1: first lower limit value
Min.2: second lower limit value
S10 to S28: step

What is claimed is:

1. An image processing device comprising:

a processor configured to acquire a video captured based on a first video capturing mode or a second video capturing mode with an imaging condition that is different from an imaging condition of the first video capturing mode;

determine a quantization parameter of image data of a frame constituting the video; and compress the image data with the quantization parameter, wherein the processor is further configured to determine the quantization parameter within a first range in a case of the first video capturing mode and determine the quantization parameter within a second range in a case of the second video capturing mode, and a second upper limit value of the second range is smaller than a first upper limit value of the first range and a second lower limit value of the second range is larger than a first lower limit value of the first range.

2. The image processing device according to claim 1, wherein the second range is set according to a setting value of a frame rate.

3. The image processing device according to claim 1, wherein the second range is set according to an input from an instruction input section that receives an external instruction.

4. The image processing device according to claim 1 wherein the processor is further configured to discriminate a scene of the video, and set the second range according to the scene.

5. The image processing device according to claim 1, wherein the processor is further configured to compress the video by an MPEG encoding method.

6. The image processing device according to claim 1, wherein the processor is further configured to determine the quantization parameter according to an amount of generated code after quantization of image data of a past frame of the video.

7. The image processing device according to claim 1, wherein, in the second video capturing mode, at least one of a shutter speed, a speed of autofocus, a tracking speed of automatic exposure, a tracking speed of white balance, or a frame rate is set faster than that of the first video capturing mode.

8. An imaging device comprising:
the image processing device according to claim 1; and
an image sensor that captures the video based on the first video capturing mode or the second video capturing mode,
wherein the processor is further configured to acquire the video captured by the image sensor.

9. An image processing method comprising:
acquiring a video captured based on a first video capturing mode or a second video capturing mode with an imaging condition that is different from an imaging condition of the first video capturing mode;
determining a quantization parameter of image data of a frame constituting the video; and
compressing the image data with the quantization parameter,
wherein the quantization parameter is determined within a first range in a case of the first video capturing mode and the quantization parameter is determined within a second range in a case of the second video capturing mode, and
a second upper limit value of the second range is smaller than a first upper limit value of the first range and a second lower limit value of the second range is larger than a first lower limit value of the first range.

10. The image processing method according to claim 9, wherein the second range is set according to a setting value of a frame rate.

11. The image processing method according to claim 9, wherein the second range is set according to an input from an instruction input section that receives an external instruction.

12. The image processing method according to claim 9, further comprising:
discriminating a scene of the video,
wherein the second range is set according to the discriminated scene.

13. The image processing method according to claim 9, wherein the video is compressed by an MPEG encoding method.

14. The image processing method according to claim 9, wherein the quantization parameter is determined according to an amount of generated code after quantization of image data of a past frame of the video.

15. The image processing method according to claim 9, wherein, in the second video capturing mode, at least one of a shutter speed, a speed of autofocus, a tracking speed of automatic exposure, a tracking speed of white balance, or a frame rate is set faster than that of the first video capturing mode.

16. A non-transitory computer readable medium for storing an image processing program causing a computer to perform a method, the method comprising:
acquiring a video captured based on a first video capturing mode or a second video capturing mode with an imaging condition that is different from an imaging condition of the first video capturing mode;
determining a quantization parameter of image data of a frame constituting the video; and
compressing the image data with the quantization parameter,
wherein, the quantization parameter is determined within a first range in a case of the first video capturing mode and the quantization parameter is determined within a second range in a case of the second video capturing mode, and
a second upper limit value of the second range is smaller than a first upper limit value of the first range and a second lower limit value of the second range is larger than a first lower limit value of the first range.

* * * * *

UNITED STATES PATENT AND TRADEMARK OFFICE

CERTIFICATE OF CORRECTION

PATENT NO. : 11,223,826 B2
APPLICATION NO. : 17/183051
DATED : January 11, 2022
INVENTOR(S) : Yukinori Nishiyama et al.

It is certified that error appears in the above-identified patent and that said Letters Patent is hereby corrected as shown below:

In the Specification

Column 18, Lines 1-3:
Change:
"[Table 1] shows an example of the lower limit value and the upper limit value of the QP value. [Table 1] [0142] [About Scene Discrimination]"
To:
--[Table 1] shows an example of the lower limit value and the upper limit value of the QP value.
[Table 1]

| Frame Rate/Mode | Lower limit value of QP | Upper limit value of QP |
|---|---|---|
| Normal video (30 fps) | 0 | 51 |
| Video for static image extraction (30 fps) | 12 | 39 |
| Video for static image extraction (30 fps) (Momentary change cutout mode) | 15 | 36 |
| Video for static image extraction (60 fps) | 18 | 45 |

[About Scene Discrimination]--

Signed and Sealed this
Seventh Day of May, 2024

Katherine Kelly Vidal

Katherine Kelly Vidal
*Director of the United States Patent and Trademark Office*